(12) United States Patent
Hassan et al.

(10) Patent No.: US 11,941,471 B2
(45) Date of Patent: Mar. 26, 2024

(54) TECHNIQUES FOR REFLECTING STATE CHANGES USING RFIDS

(71) Applicant: Microsoft Technology Licensing, LLC, Redmond, WA (US)

(72) Inventors: Amer Aref Hassan, Kirkland, WA (US); Shaun Paul Dunning, San Clemente, CA (US); Eric Edmond Thomasian, Los Angeles, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 83 days.

(21) Appl. No.: 17/387,973

(22) Filed: Jul. 28, 2021

(65) Prior Publication Data

US 2023/0033279 A1  Feb. 2, 2023

(51) Int. Cl.
   *G06K 19/07*    (2006.01)
   *G06K 19/073*   (2006.01)
   *G06K 19/077*   (2006.01)

(52) U.S. Cl.
   CPC ... *G06K 19/0723* (2013.01); *G06K 19/07345* (2013.01); *G06K 19/07767* (2013.01)

(58) Field of Classification Search
   CPC .................. G06K 19/07345; G06K 19/07767
   USPC ....................................................... 235/492
   See application file for complete search history.

(56) References Cited

U.S. PATENT DOCUMENTS

| | | |
|---|---|---|
| 5,874,724 A | 2/1999 | Cato |
| 7,791,481 B2 | 9/2010 | Andt et al. |
| 9,082,057 B2 | 7/2015 | Mcgregor |
| 9,113,844 B2 | 8/2015 | Hollstien |
| 9,189,725 B2 | 11/2015 | Blot et al. |
| 9,826,289 B2 | 11/2017 | Zheng et al. |

(Continued)

FOREIGN PATENT DOCUMENTS

| | | |
|---|---|---|
| EP | 2333701 A1 | 6/2011 |
| EP | 3107042 A1 | 12/2016 |

OTHER PUBLICATIONS

"QSD123", Retrieved from: https://www.digikey.com/en/products/detail/on-semiconductor/QSD123/187443?utm_adgroup=Optical%20Sensors%20-%20Phototransistors&utm_source=google&utm_medium=cpc&utm_campaign,=Shopping_Product_Sensors%2C%20Transducers_NEW&utm_term=&utm_content=Optical%20Sensors%20-%0Phototransistors&gclid=EAIaIQobChMI7t6m_baV8AIV8yGtBh1Pvw6IEAQYAyABEgLBavD_BwE, Retrieved Date: May 3, 2021, 6 pages.

(Continued)

*Primary Examiner* — Michael G Lee
*Assistant Examiner* — David Tardif
(74) *Attorney, Agent, or Firm* — NovoTechIP International PLLC

(57) ABSTRACT

A sensor device includes a first antenna configured to receive an interrogation radio frequency (RF) signal; a first sensor configured to detect a first state of a first sensed signal, to output a first sensor signal responsive to the first state meeting a first threshold condition; a first circuit coupled to the first antenna, the first circuit configured to receive the interrogation RF signal from the first antenna, modulate a second RF signal, and transmit the modulated second RF signal as a RF response signal; and a first tag controller configured to receive the first sensor signal and to selectively connect or disconnect the first antenna to or from ground responsive to the first sensor signal, wherein connecting the first antenna to ground prevents the first antenna from transmitting the RF response signal.

20 Claims, 19 Drawing Sheets

(56) References Cited

U.S. PATENT DOCUMENTS

| | | | |
|---|---|---|---|
| 2003/0179106 A1* | 9/2003 | Neff | G08G 1/095 |
| | | | 340/901 |
| 2005/0242957 A1 | 11/2005 | Lindsay et al. | |
| 2006/0025897 A1* | 2/2006 | Shostak | G08G 1/017 |
| | | | 701/1 |
| 2007/0040683 A1 | 2/2007 | Oliver et al. | |
| 2020/0082722 A1* | 3/2020 | Beiski | G06K 7/10366 |
| 2020/0388919 A1* | 12/2020 | Kim | H01Q 5/314 |

OTHER PUBLICATIONS

Zhou, et al., "Laser-activated RFID-based Indoor Localization System for Mobile Robots", In Proceedings of IEEE International Conference on Robotics and Automation, Apr. 10, 2007, 3 Pages.
"International Search Report and Written Opinion Issued in PCT Application No. PCT/US22/032590", dated Oct. 6, 2022, 9 Pages.

\* cited by examiner

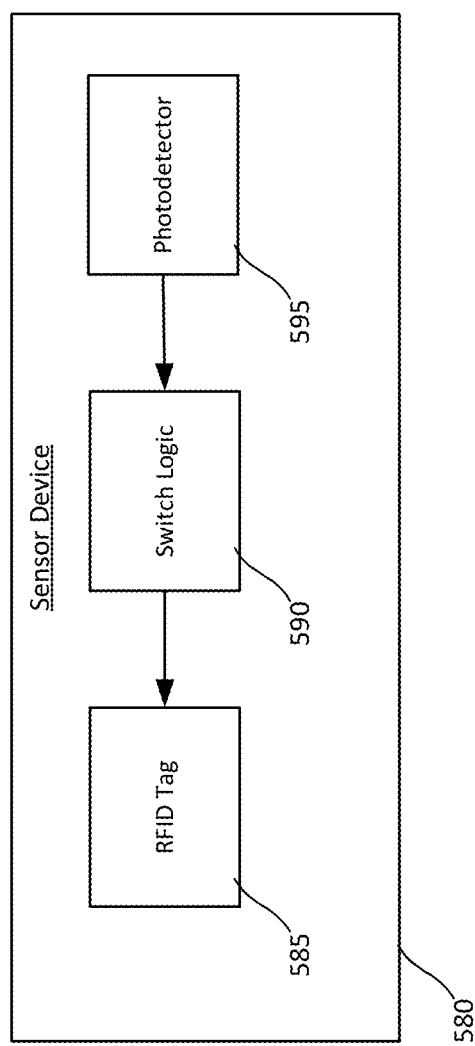

TECHNIQUES FOR REFLECTING STATE CHANGES USING RFIDS

BACKGROUND

Many devices may be disposed in locations where the state of the device may not be readily determined. Remote sensors may be placed on such devices to monitor the state of the device and to report the state of the device to a remote system. Such sensors may include a wired or wireless connection that may be used to transmit data indicative of the state of the device being monitored. However, such remote sensors typically require a battery or access to an external power source. Batteries periodically require replacement, and an external power source may not be feasible depending upon the environment in which the remote sensors have been deployed. Hence, there is a need for improved systems and methods for providing and operating remote sensors to provide information reflecting state changes of monitored devices.

SUMMARY

An example sensor device according to the disclosure may include a first radio-frequency identification (RFID) tag, a first sensor, and a tag controller. The first RFID tag includes a first antenna configured to receive an interrogation radio frequency (RF) signal, and a first circuit coupled to the first antenna, the first circuit configured to receive the interrogation RF signal from the first antenna, generate a first response RF signal, and cause the first antenna to transmit the first response RF signal. The first sensor is configured to detect a first state of a monitored device, to output a first sensor signal when the first state meets a first threshold condition. The tag controller is configured to receive the first sensor signal and to selectively connect or disconnect the first antenna to or from ground in response to the first sensor signal or in response an absence of the first sensor signal, wherein connecting the first antenna to ground prevents the first antenna from transmitting the first response RF signal.

An example method for operating a sensor device according to the disclosure includes detecting a first state of a monitored device using a first sensor of the sensor device; outputting a first sensor signal from the first sensor when the first state meets a first threshold condition; selectively connecting or disconnecting the first antenna of the sensor device to or from ground using a first tag controller responsive to the first tag controller receiving first sensor signal or responsive to an absence of the first sensor signal, wherein: connecting the first antenna to ground prevents the first antenna from transmitting a first response radio frequency (RF) signal upon receiving an interrogation RF signal, and disconnecting the first antenna from ground permits the first antenna to transmit the first response RF signal upon receiving the interrogation RF signal; receiving the interrogation RF signal via the first antenna of the sensor device; and transmitting the first response RF signal upon receiving the interrogation RF signal or responsive to the absence of the first signal with the first antenna being disconnected from the ground.

An example computer-readable storage medium according to the disclosure on which are stored instructions which when executed cause a processor of a programmable device to perform operations of: detecting a first state of a monitored device using a first sensor of the sensor device; outputting a first sensor signal from the first sensor when the first state meets a first threshold condition; selectively connecting or disconnecting the first antenna of the sensor device to or from ground using a tag controller responsive to the tag controller receiving first sensor signal or responsive to an absence of the first sensor signal, wherein: connecting the first antenna to ground prevents the first antenna from transmitting a first response radio frequency (RF) signal upon receiving an interrogation RF signal, and disconnecting the first antenna from ground permits the first antenna to transmit the first response RF signal upon receiving the interrogation RF signal; receiving the interrogation RF signal via the first antenna of the sensor device; and transmitting the first response RF signal upon receiving the interrogation RF signal and with the first antenna being disconnected from the ground.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C, 5D, and 5E are diagrams showing an example of the techniques provided herein being implemented in a traffic signal.

DETAILED DESCRIPTION

Figure 1A:
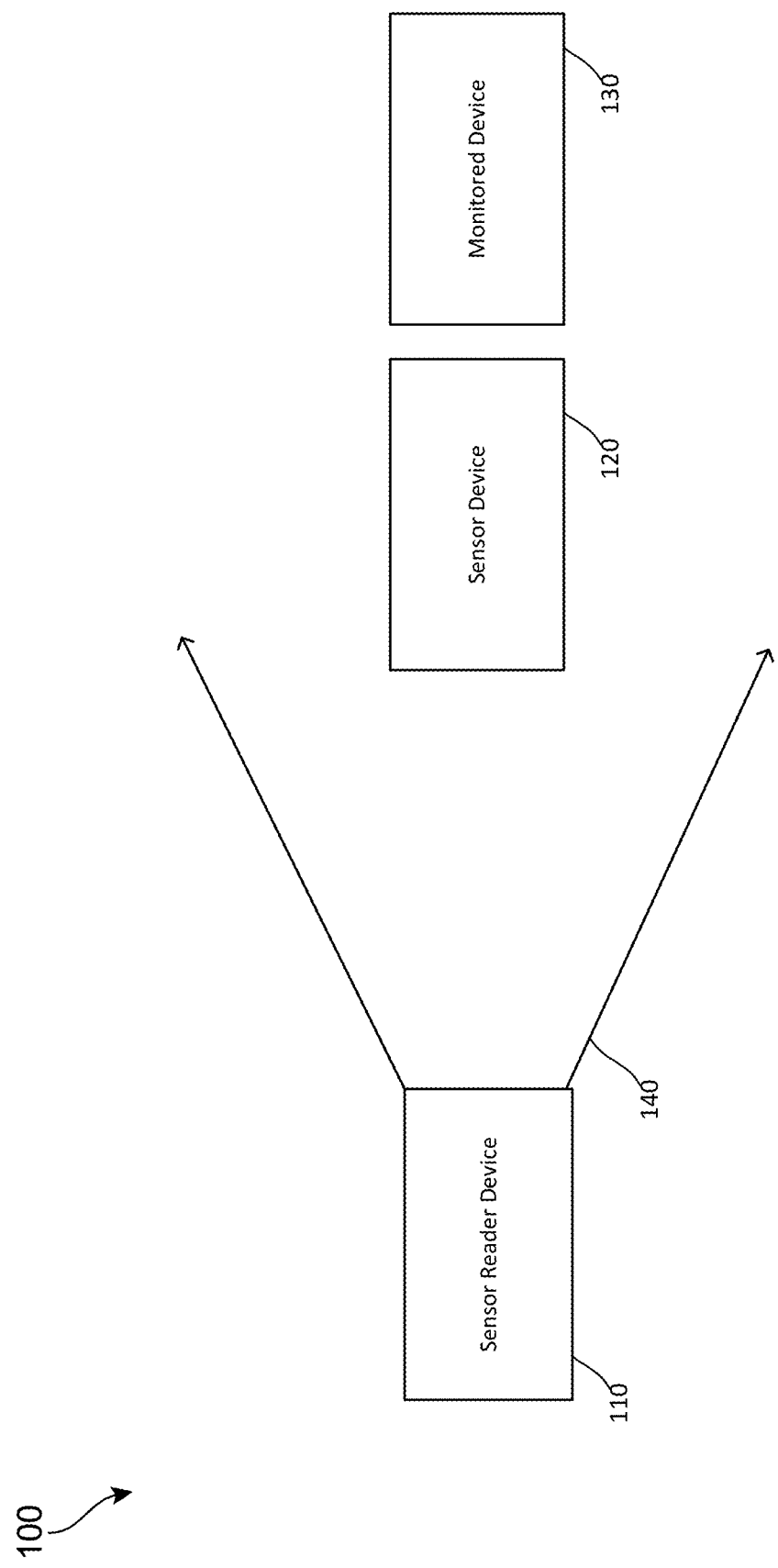
FIGS. 1A and 1B are diagrams showing an example computing environment in which the techniques provided herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are described herein for providing a sensor device that controls the operation of a radio-frequency identification (RFID) tag based on a state sensed by the sensor device. The sensor device may be configured to receive an interrogation signal from a sensor reader device and transmit a response signal. The response signal may include information indicative of the state sensed by the sensor. The sensor device may be configured to selectively control whether the RFID tag may respond to the interrogation signals from the sensor reader device. The sensor device may include a sensor that outputs a sensor signal based on a sensed state of a signal monitored by the sensor. The sensor device may also include a switch, and the sensor device may control the operation of the switch based on the sensor signal to selectively connect the antenna of the RFID tag to ground or to disconnect the antenna of the RFID tag from the ground. When the antenna is disconnected from ground, the energy of the interrogation signal received by the antenna may be used to power the control circuit of the RFID tag which causes the RFID tag to transmit a response signal in response to receiving the interrogation signal. When the antenna is connected to ground, the energy of the interrogation signal received by the antenna is instead directed to ground to prevent the RFID tag from transmitting a response signal in response to receiving the interrogation signal. A technical benefit of the sensor devices provided herein is that the sensor devices may be used to monitor the state of a device without requiring changes to the device. The sensor device may be affixed to or disposed near an object to be monitored or in an area to be monitored. Another technical benefit is that the sensor devices may be read remotely, and thus may be disposed in areas that are not readily accessible for human operators to read a status of the sensor device. Another technical benefit is that these sensor devices provide a flexible solution for reporting various states of the monitored device. For example, the sensor device may be configured to provide a response signal that indicates that a monitored device is operating correctly, and the sensor device may disable the transmission of the response signal responsive to the sensor device detecting a state of the monitored device that indicates that the monitored device may not be operating correctly or requires service. Conversely, the sensor device may be configured to provide a response signal that indicates that the monitored device is not operating correctly, and the sensor device may be configured to enable the transmission of the response signal response signal responsive to the sensor device detecting a state of the monitored device that indicates that the monitored device may not be operating correctly or requires service. Yet another technical benefit or the sensor devices is that the do not require an onboard power source, as the sensor device may receive power from the interrogation signal. Furthermore, the sensor device provides a significant flexibility in the types of states that may be monitored. A sensor device may include various types of sensors, including but not limited to light sensors, accelerometers, temperature sensors, vibration sensors, moisture sensors, chemical sensors, pressure sensors, and/or other types of sensors that may be used to monitor a state of a monitored device and/or of a monitored area. These and other technical benefits of the techniques disclosed herein will be evident from the discussion of the example implementations that follow.

FIG. 1 is a diagram showing an example computing environment 100 in which the techniques disclosed herein for providing a sensor device that controls the operation of an RFID tag based on a state sensed by the sensor device may be implemented. The computing environment 100 may include a sensor reader device 110, a sensor device 120, and a monitored device 130. The examples shown in FIG. 1 include a single sensor reader device 110, a single sensor device 120, and a single monitored device 130. However, other implementations may include multiple sensor reader devices 110, sensor devices 120, and/or monitored devices 130.

The sensor reader device 110 may be a computing device configured to transmit an interrogation signal to cause the sensor device 120 to transmit a response signal if a state measured by the sensor device 120 meets certain conditions. The sensor reader device 110 may be a dedicated computing device for reading sensor data or may be computing device configured with the capability to interact with the sensor device 120 but also perform other computation tasks. The sensor reader device 110 may have different form factors. The sensor reader device 110 may be a portable dedicated sensor reader, a mobile phone, a tablet computer, a laptop computer, a portable digital assistant device, and/or other such portable computing device. The sensor reader device 110 may also be integrated into a computing device of a vehicle, such as a built-in navigation system, entertainment system, or other computer system that is built into a vehicle or robotic device. The vehicle may in be semi-autonomous or autonomous vehicle or may be a human-operated vehicle. Vehicles may include a car, truck, bus, aircraft, a drone, or other such vehicle that may traverse an environment that includes sensor devices 120 that may be interrogated by the sensor reader device 110. In some implementations, a robotic device or drone may include the sensor reader device 110 and may be configured to traverse an area in which the sensor device 120 may be deployed.

Figure 1B:
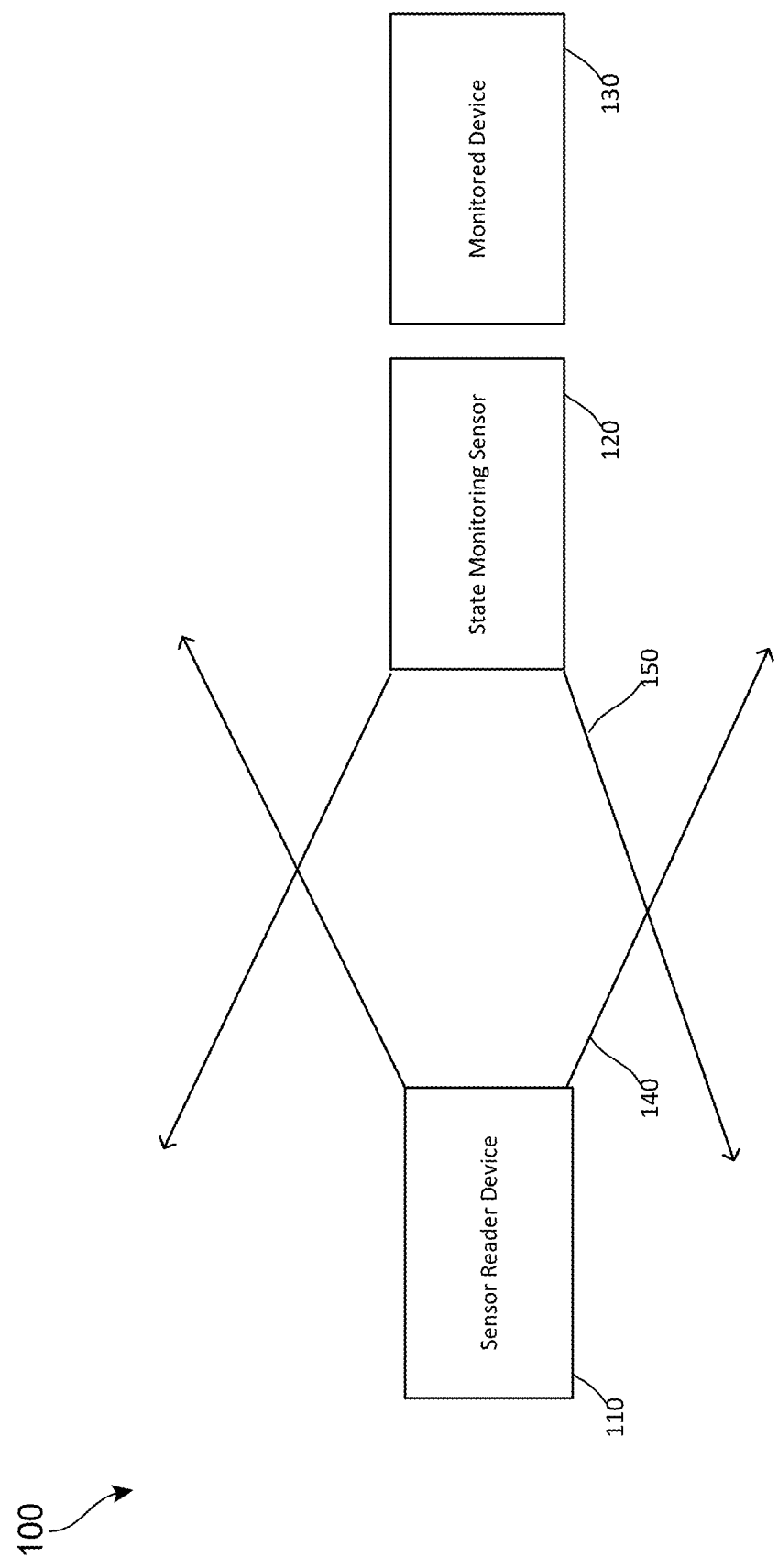

The sensor device 120 is configured to receive the interrogation signal 140 transmitted by the sensor reader device 110 and may respond with a response signal 150 that conveys information about the state measured by at least one sensor of the sensor device 120 as shown in FIG. 1B. In some implementations, the response signal may be a spread spectrum signal. A technical benefit of this approach is that in implementations where there are multiple sensor devices 120 proximate to one another, the response signals from the sensor devices 120 may be less likely to interfere with one another. The sensor device 120 may include various types of sensors, including but not limited to light sensors, accelerometers, temperature sensors, vibration sensors, moisture sensors, chemical sensors, pressure sensors, and/or other types of sensors that may be used to monitor a state of a monitored device and/or of a monitored area. In some implementations, the sensor device 120 may be configured to detect a state of the monitored device 130 and output a sensor signal responsive to the state meeting a threshold condition. The type of signal and state of the signal being sensed depends upon the type of sensor included in the sensor device 120. For example, a light sensor may be configured to determine an intensity of light received by the signal. In the examples shown in FIGS. 5A-5E, the monitored device 130 is a traffic signal, and the sensor device 120 is configured to output a sensor signal responsive to the intensity of light received by the sensor exceeding a threshold. The threshold may be selected in this example based on the intensity of light expected to be received when a particular light of the traffic signal is illuminated. A detailed description of these example implementations is provided below. Other types of sensors may also be used instead of or in addition to light sensors. The examples which follow describe some of the other types of sensors that may be used.

The sensor device 120 may include an RFID tag that may be configured to receive the interrogation signal 140 transmitted by the sensor reader device 110 and to transmit the response signal 150 that conveys information about the state measured by at least one sensor of the sensor device 120. The sensor device 120 may include a switch configured to receive the sensor signal output by the sensor of the sensor device 120 and to selectively connect the antenna of the RFID tag to ground or disconnect the antenna from ground responsive to the first sensor signal. Connecting the first antenna to ground prevents the first antenna from transmitting the response signal. In some implementations, the switch may be configured to disconnect the antenna of the RFID tag from ground responsive to receiving the sensor signal from the sensor and to connect the antenna to ground responsive to the first sensor not outputting the sensor signal. In other implementations, the switch may be configured to connect the antenna to ground responsive to receiving the sensor signal from the sensor, and to disconnect the antenna from ground responsive to the sensor outputting the sensor signal. The output from the sensor may be used to control whether sensor device 120 may respond to the interrogation signal 140 of the sensor reader device 110.

Figure 2:
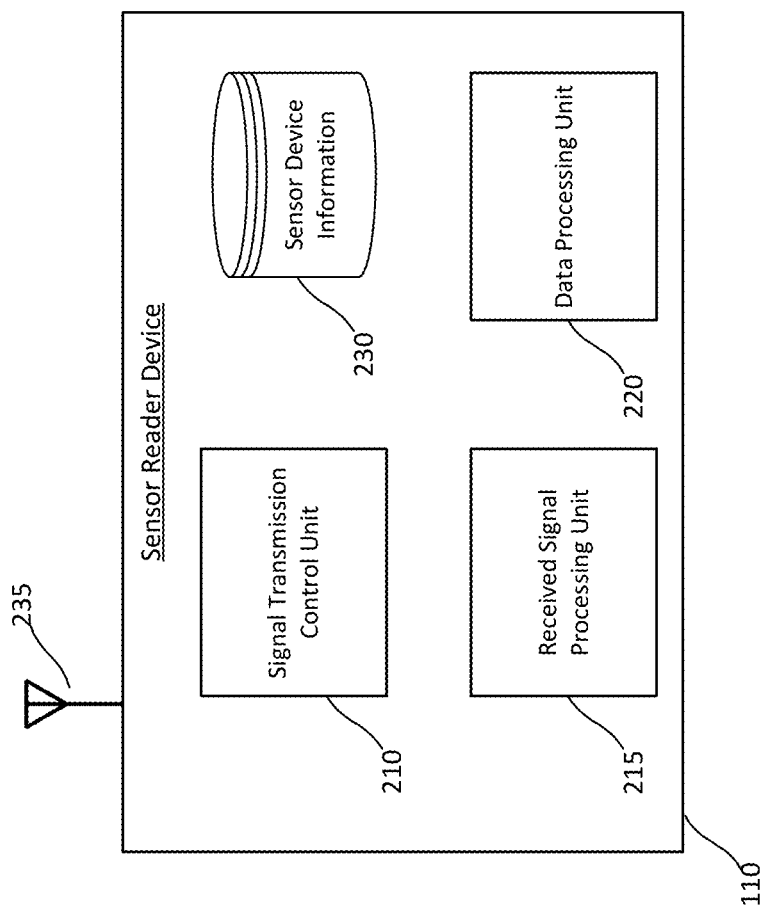
FIG. 2 is a diagram showing additional details of a sensor reader device shown in FIG. 1.

FIG. 2 is a diagram of an example implementation of the sensor reader device 110 shown in FIGS. 1A and 1B. The sensor reader device 110 may transmit interrogation signals which may be received by the sensor device 120, and the sensor device 120 may respond with response signals depending on the state of a sensed signal. As discussed above, the type of signal and the state thereof are dependent upon the type of sensor being used by the sensor device 120.

The sensor reader device 110 may include a signal transmission control unit 210, a received signal processing unit 215, a data processing unit 220, a sensor device information datastore 230, and an antenna 235. The signal transmission control unit 210 may be configured to control the antenna 235 to transmit a first electromagnetic signal to interrogate sensor devices 120 within range of the first electromagnetic signal. The sensor devices 120 may include RFID tags that may read by the sensor reader device 110 from different ranges and may operate using different frequency ranges. Ultra high-frequency (UHF) tags may operate in a frequency range of 300 to 1000 MHz and may have a read range of approximately 15 to 20 feet. UHF tags may provide anti-collision capability, which allows multiple tags to be read simultaneously. Microwave tags that may operate in a frequency range from 1 to 10 GHz. While the microwave frequency range spans 1 to 10 GHz, microwave tags typically utilize two frequency ranges around 2.4 GHz and 5.8 GHz for RFID application. Passive microwave tags have a read range of up to 100 feet and active microwave tags have a read range of up to 350 feet. Millimeter-wave frequency tags may operate in a frequency range from 30 GHz to 300 GHz and provide an even greater read range. The specific frequency range used may depend upon how far away the sensor reader device 110 may need to read the sensor devices 120 and characteristics of the environment in which the sensor devices 120 are deployed. The environment may include features that may interfere with certain frequency ranges and/or may limit how close the sensor reader device 110 may be able get to the sensor device 120 to be read. The read distance may also depend at least in part on how fast the sensor reader device 110 may be traversing the environment in which the sensor devices 120 have been deployed. For example, the sensor reader device 110 may be integrated into a navigation system of a vehicle or drone which may use the sensor information to assist in navigation through a navigable environment.

The received signal processing unit 215 may be configured to analyze spread-spectrum electromagnetic response signals transmitted by the RFID tags in response to the interrogation signal transmitted by the sensor reader device 110. The response signals may be spread-spectrum signals. The response signals may include information identifying the type of monitored device 130 being monitored, a unique identifier for the monitored device 130, geographical coordinate information associated with the location of the monitored device 130, and/or other information that may be used when processing the data obtained from the sensor device 120. The receiving signal processing unit 215 may include logic for demodulating and/or decoding the spread-spectrum electromagnetic signals transmitted by the RFID tags of the sensor devices 120 to obtain the information included therein.

The sensor device information datastore 230 may be used to at least temporarily store the information obtained from the sensor devices 120 that have been read by the sensor reader device 110. The data processing unit 220 of the sensor reader device 110 may be configured to reformat the information extracted from the response signals transmitted by the sensor devices 120 into a format that may be stored in the sensor device information datastore 230. The data processing unit 220 may also perform additional actions associated with the information obtained from the sensor devices 120. In some implementations, the data processing unit 220 may generate reports that include information indicative of the state of the monitored device 130 and/or an environment in which the monitored device 130 is disposed. Furthermore, the data processing unit 220 analyze the information indicative of the state of the monitored device 220 to identify issues that may require maintenance and/or repair of the monitored device 130. The data processing unit 220 may be configured to send an alert message to a maintenance service (not shown) that is configured to receive service requests and to assign a technician to perform the requested maintenance or repair of the monitored device 130. In yet other implementations, the sensor reader device 110 may be implemented in a navigation system. In such implementations, the information indicative of the state of the monitored device 130 may be used to determine navigation information for navigating a vehicle or drone through a navigable environment. The vehicle or drone may be autonomous or semi-autonomous and may use the navigation information to control the operation of at least some aspects of the vehicle or drone, such as braking, steering, and/or acceleration. The monitored device 130 may be traffic signal and the sensor device 120 may determine that a particular light (e.g., red, yellow, or green) is illuminated and provide navigation information to the vehicle according to the state of the traffic signal. The sensor reader device 110 may also be configured to perform other actions on the information obtained from the response signals received from the sensor devices 120.

Figure 3:
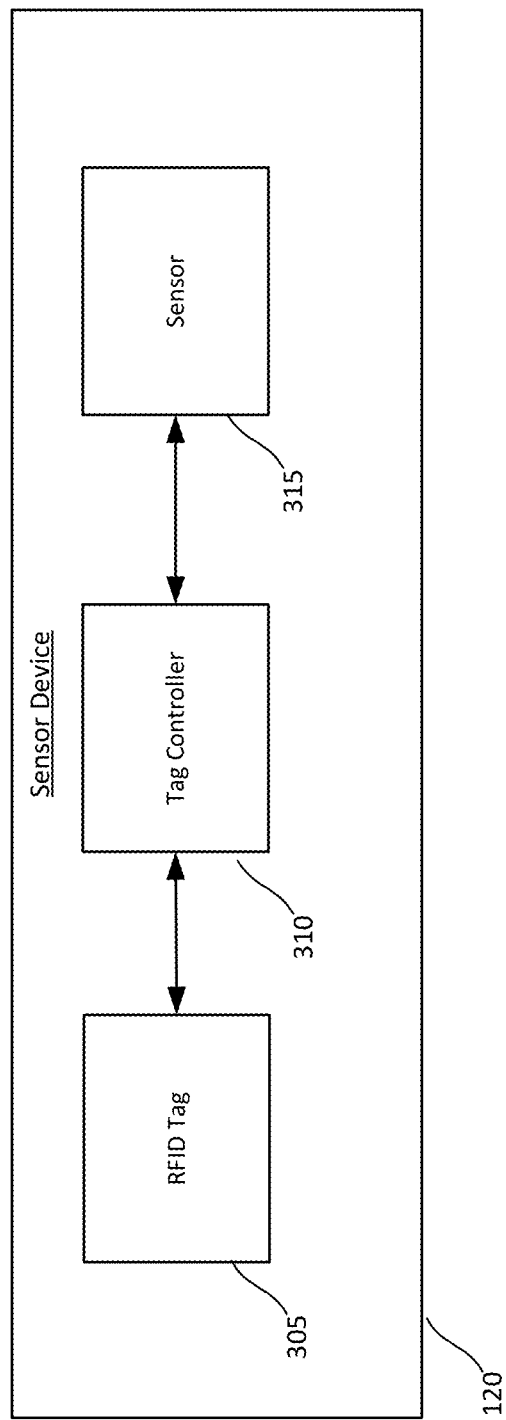
FIG. 3 is a diagram showing additional details of a sensor device shown in FIGS. 1A and 1B.

FIG. 3 is a diagram of an example implementation of the sensor device 120 shown in FIGS. 1A and 1B. The sensor device 120 may include an RFID tag 305, a tag controller 310, and a sensor 315.

The RFID tag 305 may be implemented using tags that may be read by the sensor reader device 110 from different ranges and may operate using different frequency ranges. As discussed in the preceding examples, a particular frequency range may be selected based on the desired read range for the sensor device 120 and other factors discussed above.

The tag controller 310 may be configured to selectively enable or disable the ability of the RFID tag 305 from transmitting a response signal in response to an interrogation signal from the sensor reader device 110. The tag controller 310 may selectively enable or disable the ability of the RFID tag 305 to transmit the response signal based on a sensor signal generated by the sensor 315 or an absence of the sensor signal. In some implementations, the tag controller 310 may be implemented as a switch configured to receive the first sensor signal and to selectively connect the first antenna to ground or disconnect the first antenna from the ground responsive to the first sensor signal. Connecting the antenna of the RFID tag 305 to ground prevents the RFID tag 305 from transmitting the response RF signal.

The tag controller 310 may be configured to respond to receiving the sensor signal by: (1) enabling the ability of RFID tag 305 to transmit a response signal 150 in response to an interrogation signal 140, or (2) disabling the ability of the RFID tag 305 to transmit a response signal 150 in response to the interrogation signal 140. Conversely, the tag controller 310 may be configured to respond to not receiving the sensor signal by: (1) enabling the ability of RFID tag 305 to transmit a response signal 150 in response to an interrogation signal 140, or (2) disabling the ability of the RFID tag 305 to transmit a response signal 150 in response to the interrogation signal 140. The particular configuration of the tag controller 310 may depend upon the particular application in which the sensor device 120 is being used and the type of sensor used to implement the sensor 315 of the sensor device 120. Thus, the tag controller 310 may be configured to respond both to situations where the tag controller 310 is receiving the sensor signal from the sensor 315 or not receiving the sensor signal from the sensor 315.

Figure 4:
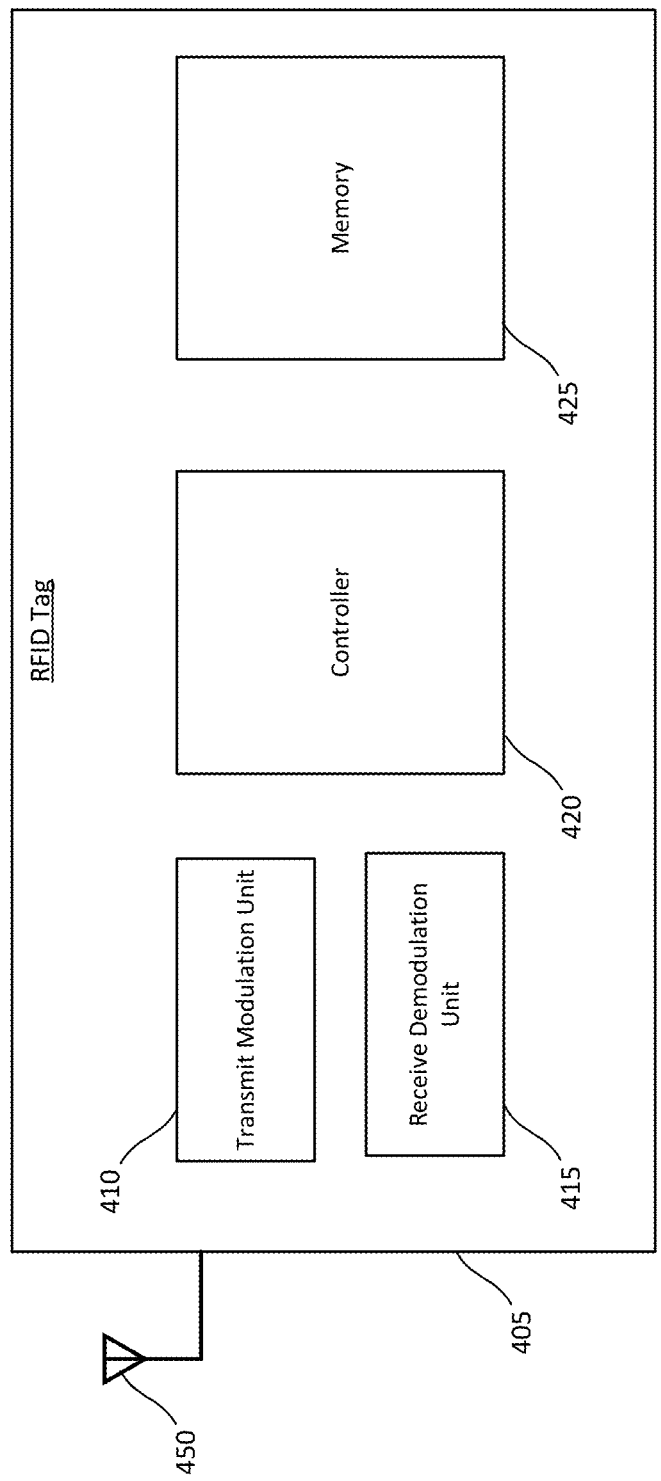
FIG. 4 is a diagram showing an example RFID tag implementation.

FIG. 4 is a diagram of an example implementation of an RFID tag 405 that may be used to implement the sensor device 120 shown in the preceding examples. The RFID tag 405 includes an antenna 450, a transmit modulation unit 410, a receive demodulation unit 415, a controller 420, and a memory 425. The tag 405 may be a passive RFID tag powered by the interrogation signals generated by the sensor reader device 110. In other implementations, the tag may be an active tag that includes a battery or other power source (not shown). The tag 405 may also be a semi-passive RFID tag that is configured to use the interrogation signals to power the transmission of the response signal by the RFID tag 405, but the controller and other elements of the tag are powered by a battery or other power source. In some implementations, the other power source may be the monitored device 130. The monitored device 130 may be a powered device that may provide power to the RFID tag 405. For example, in the preceding example implementations, the monitored device 130 is a traffic light, which could provide power to the RFID tag 405. However, such implementation would require that the monitored device 130 be modified to provide the power to the RFID tag 405 and/or other components of the sensor device 120.

The RFID tag 405 may be implemented to operate using different frequency ranges which may provide different read ranges. As discussed in the preceding examples, the tag 405 may be implemented to operate in the UHF, microwave, or millimeter wave frequency ranges. Ultra high-frequency (UHF) tags may operate in a frequency range of 300 to 1000 MHz and may have a read range of approximately 15 to 20 feet. UHF tags may provide anticollision capability, which allows multiple tags to be read simultaneously. Microwave tags that may operate in a frequency range from 1 to 10 GHz. While the microwave frequency range spans 1 to 10 GHz, microwave tags typically utilize two frequency ranges around 2.4 GHz and 5.8 GHz for RFID application. Passive microwave tags have a read range of up to 100 feet and active microwave tags have a read range of up to 350 feet. Millimeter-wave frequency tags may operate in a frequency range from 30 GHz to 300 GHz and provide an even greater read range. The specific frequency range selected may depend upon the type of navigable environment, the types of navigable vehicles traversing the navigable environment, how fast the vehicles may be traversing the environment, and how far away from the tagged objects in the navigable environment that the tags need to be read by the sensor reader device 110.

The RFID tag 450 may be configured to receive an interrogation signal from the sensor reader device 110 shown in the preceding examples via the antenna 450. The interrogation signal may be modulated, and the receive demodulation unit 415 may be configured to demodulate the modulated interrogation signal and to provide the demodulated signal to the controller 420. The controller 420 may comprise an electronic circuit or microchip that implements processing logic which may implement the logic of the transmit modulation unit 410 and/or the receive demodulation unit 415. The controller 420 may be configured to read and/or write data to the memory 425. The controller 420 may also be configured to decode digital bits in the interrogation signal received from the sensor reader device 110 and/or to encode digital bits in the response signal to be transmitted in response to the interrogation signal. The controller 420 may further be configured to provide power control for the tag 405.

The memory 425 may be a read-only memory, a write-once memory, or write-many times. The memory may be divided into blocks or banks of memory, and each bank of memory may be read-only memory, a write-once memory, or write-many times memory. The tags may use electrically erasable, programmable, read-only memory (EEPROM) which does not require power to retain the contents of the memory. The memory may be used to store various types of information, such as information identifying the type of monitored device 130, a unique identifier for the monitored device 130 being monitoring, geographical coordinate information associated with the location of the monitored device 130, and/or other information that may be used when processing the data obtained from the sensor device 120. Some implementations may tags having a write-once memory so that the tag information for a particular monitored device 130 on which the tag or tags are monitoring may be updated with information associated with the monitored device 130 but cannot be updated once the tags have been programmed. This approach may be used to prevent unauthorized modifications or tampering with the RFID tag data that has been deployed for monitoring the state of a monitored device 130. The information may also include a state identifier that indicates a specific state of the monitored device. For example, where the sensor device 120 is used to monitor a traffic signal, the response signal may indicate whether a particular light of the traffic signal is illuminated. Other state information may be included based on the particular information. The state information may indicate whether the monitored device 130 is operating correctly or may be experiencing a problem that requires repairs or maintenance.

The tag 405 may be configured such that the tag generates a spread-spectrum response signal in response to an interrogation signal by the navigation device 425. A spread-spectrum signal may be used to reduce the impact of interference on the response signals generated by the tag 405. This approach may be particularly useful where there are large number of tags deployed proximate to one another. Such an implementation was shown in FIG. 4. The example implementation shown in FIG. 4 is one possible configured for RFID tags that may be used with the techniques provided herein. Tags having other configurations may also be used.

FIG. 5A shows an example implementation of a sensor device 580. The sensor device 580 may be used to implement the sensor devices 120 shown in the preceding examples. The sensor device 580 includes a photodetector 595, switch logic 590, and an RFID tag 585. The photodetector 595 may be used to detect light emitted from a monitored device 130 and to output a sensor signal responsive to the detected light meeting a threshold condition. In some implementations, the photodetector 595 may be configured to output the sensor signal responsive to the intensity of the light exceeding a predetermined threshold. In other implementations, the photodetector 595 may be configured to output the sensor signal responsive to the intensity of the light not exceeding a predetermined threshold.

The sensor signal output by the photodetector may be output to the switch logic 590. The switch logic 590 may be configured to selectively control whether the RFID tag 585 is able to transmit a response signal to an interrogation signal transmitted by a sensor reader device 110. The switch logic 590 may be configured to enable or disable the transmit capability of the RFID tag 585 responsive to receiving the sensor signal from the photodetector 595. In some implementations, the switch logic 590 may enable the transmit capability of the RFID tag 585 responsive to receiving the sensor signal and disable the transmit capability of the RFID tag 585 responsive to the photodetector 595 not outputting the sensor signal. In other implementations, the switch logic 590 may disable the transmit capability of the RFID tag 585 responsive to receiving the sensor signal and enable the transmit capability of the RFID tag 585 responsive to the photodetector 595 not outputting the sensor signal.

The RFID tag 590 may be a passive RFID tag which is powered by the interrogation signal transmitted by the sensor reader device 110. The antenna of the RFID tag 590 may receive the interrogation signal and power the RFID tag 590 using the energy collected from the interrogation signal. The RFID tag 590 may generate and transmit a response signal using this energy.

Figure 6B:
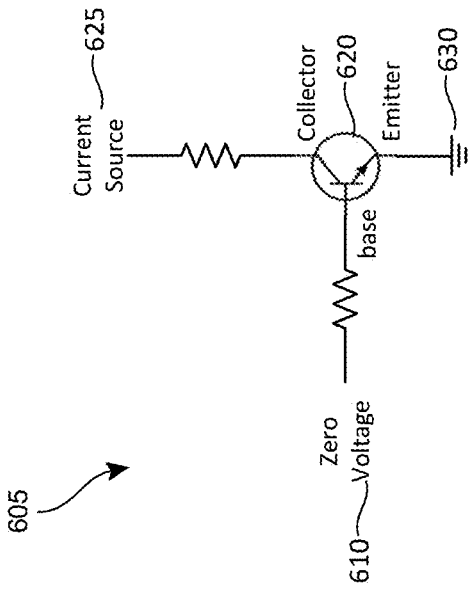
FIGS. 6A and 6B are diagrams of example switch logic that may be used to in the example implementation shown in the preceding figures.
Figure 6A:
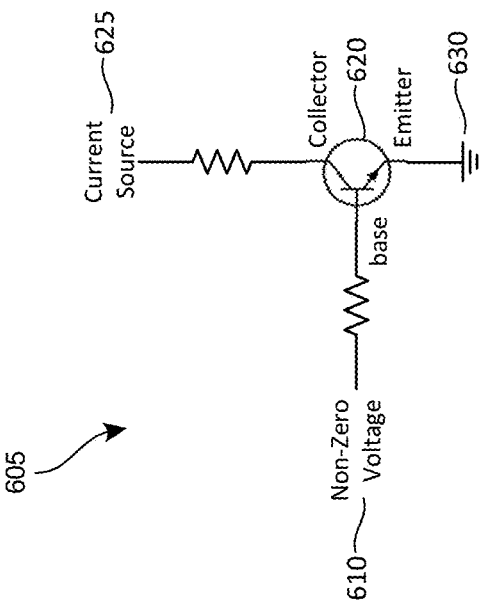

The switch logic 590 may be configured to connect the antenna of the RFID tag 585 to ground to disable the transmit capability of the RFID tag 585. If the sensor device 580 receives an interrogation signal from the sensor reader device 110 while the antenna of the RFID tag 585 is connected to ground, the energy collected by the antenna from the interrogation signal would go to ground rather than power the RFID tag 585. Thus, the switch logic 590 may selectively disable the transmit capability of the RFID tag 585 by connecting the antenna of the RFID tag 585 to ground. The switch may selectively enable the transmit capability of the RFID tag 585 by opening the switch to disconnect the antenna of the RFID to 585 from ground. An example of implementation of the switch logic are shown in FIGS. 6A and 6B. Other implementations of the switch logic 590 may also be used.

Figure 5B:
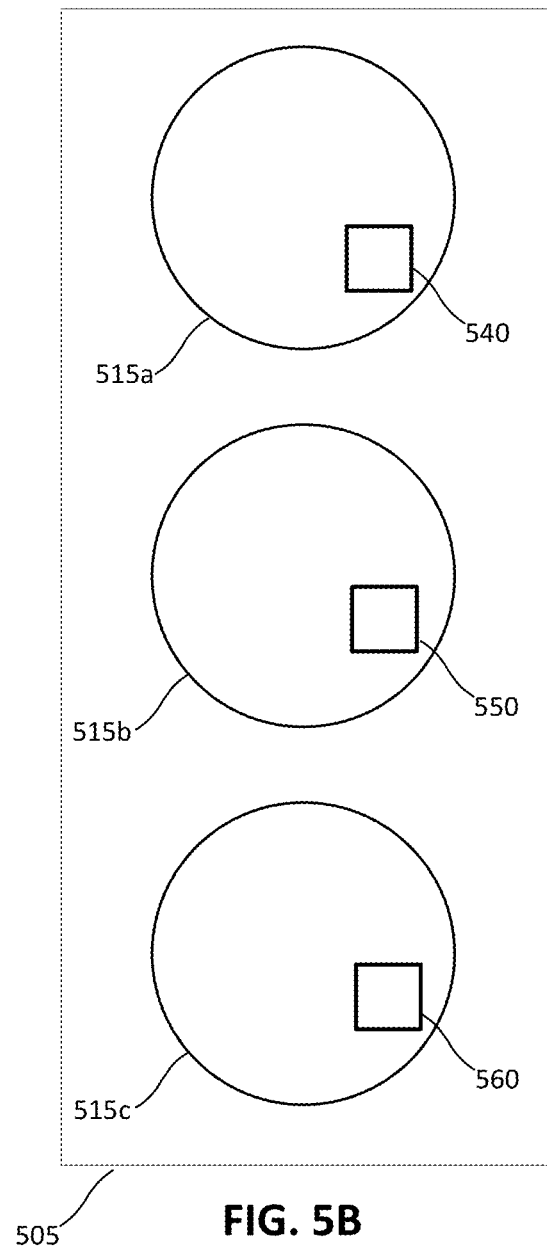

FIG. 5B shows an example of a traffic signal 505 that includes three differently colored lights 515a, 515b, and 515c that may be individually illuminated for controlling the flow of traffic through an intersection. The light 510a is being monitored by a sensor device 540. The light 510b is being monitored by a sensor device 550. The light 510c is being monitored by the sensor device 560. The sensor devices 540, 550, and 560 may be implemented by the sensor device 120 described in the preceding examples, including the sensor device 590 shown in FIG. 5A. Each of the sensor devices 540, 550, and 560 may include a photodetector 595 that is configured to detect when the respective light of the traffic signal 505 being monitored by the sensor device is illuminated and to cause the switch logic 590 to enable the transmission capability of the RFID tag 585 of the sensor device. The photo detector 595 may cause the switch logic 590 to open a switch connecting the antenna of the RFID tag 585 to ground to disconnect the antenna of the RFID tag 585 from ground. The sensor devices 580 associated with the non-illuminated lights of the traffic signal 505 may be configured to disable the transmission capability of the RFID tag 585 of the sensor devices 580 associated with the non-illuminated lights. The photo detector 595 of the sensor device 580 may be configured to not output the sensor signal where the photodetector does not detect that the respective light of the traffic signal 505 is not illuminated.

The sensor devices 540, 550, and 560 may be powered by the interrogation signal 140 transmitted by the sensor reader device 110 and do not require that the traffic signal be modified to provide power to the sensor devices. Each of the sensor devices 540, 550, and 560 may also receive power from their respective photo detector 595. Accordingly, the sensor devices 540, 550, and 560 may be deployed on existing traffic signals without requiring modifications to the traffic signals to provide power for the sensor devices sensor devices 540, 550, and 560.

Figure 5C:
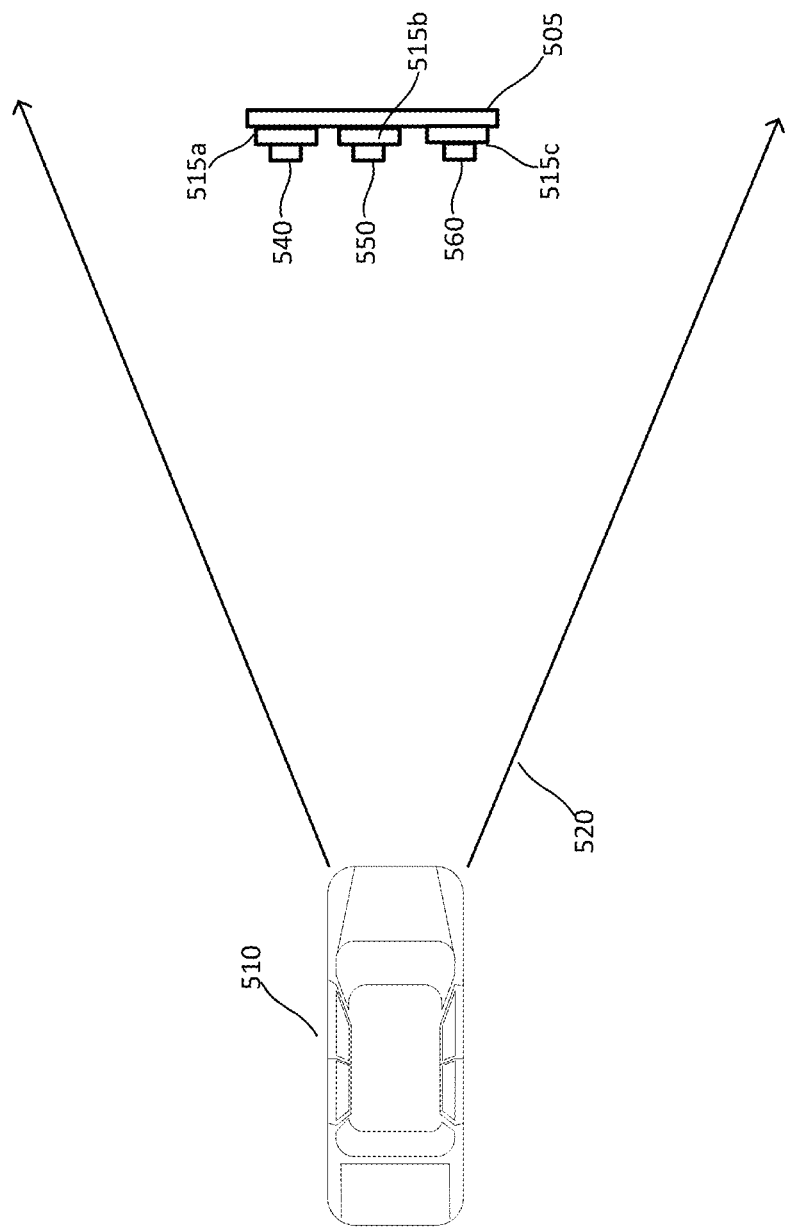

FIG. 5C is a diagram showing the traffic signal 505 and a vehicle 510. In the example shown in FIG. 5C, none of the lights 515a, 515b, and 515c of the traffic signal are currently illuminated. The vehicle 510 includes a sensor reader device 110, which may be built into a navigation system of the vehicle 510. The sensor reader device 110 is shown transmitting an interrogation signal 520. No response signals have been transmitted by the sensor devices 540, 550, and 560, which may indicate that the transmit capabilities of the sensor devices 540, 550, and 560 have been disabled responsive to the lights 515a, 515b, and 515c not being illuminated.

Figure 5D:
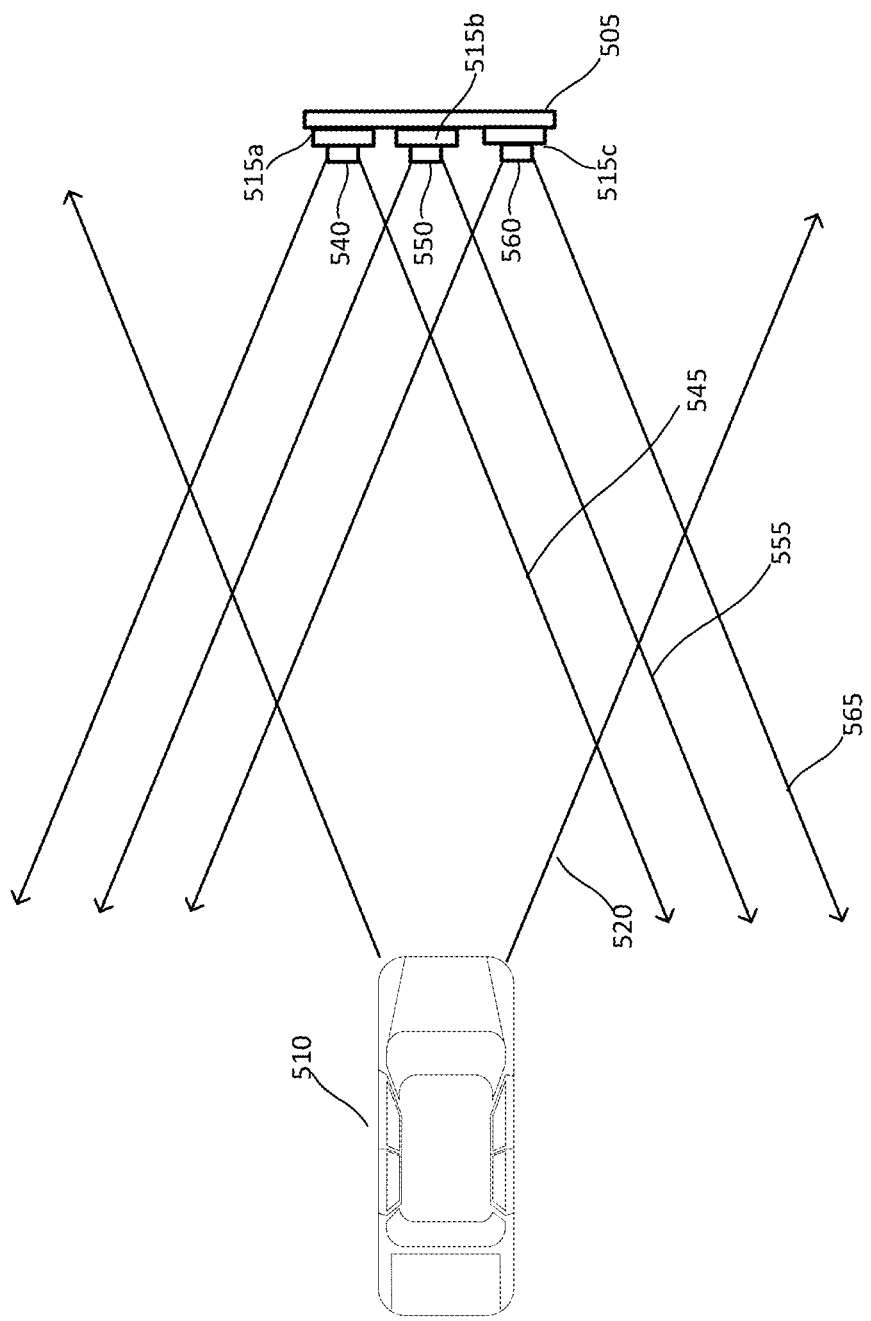

FIG. 5D shows an example in which all the lights 515a, 515b, and 515c of the traffic signal are currently illuminated. The transmit capability of RFID tags of the sensor devices 540, 550, and 560 are enabled in response to the lights being illuminated, and the sensor devices 540, 555, and 560 transmit a response signal to the interrogation signal 520. The sensor device 540 transmits a response signal 545, the sensor device 550 transmits a response signal 555, and the sensor device 560 transmits a response signal 565. The sensor devices 540, 550, and 560 may be configured to transmit respective response signals when the light being monitored by the respective sensor device is illuminated. The sensor reader device 110 of the vehicle 510 may receive the response signals and analyze the received sensor information to determine the state of the traffic signal 505. The navigation system of the vehicle may utilize this information to determine whether to generate control signals controlling one or more operating parameters of the vehicle 510. For example, if the red light or yellow light of the traffic signal 505 is illuminated, the navigation system of the vehicle 510 may generate control signals to cause the vehicle to brake and/or decelerate.

Figure 5E:
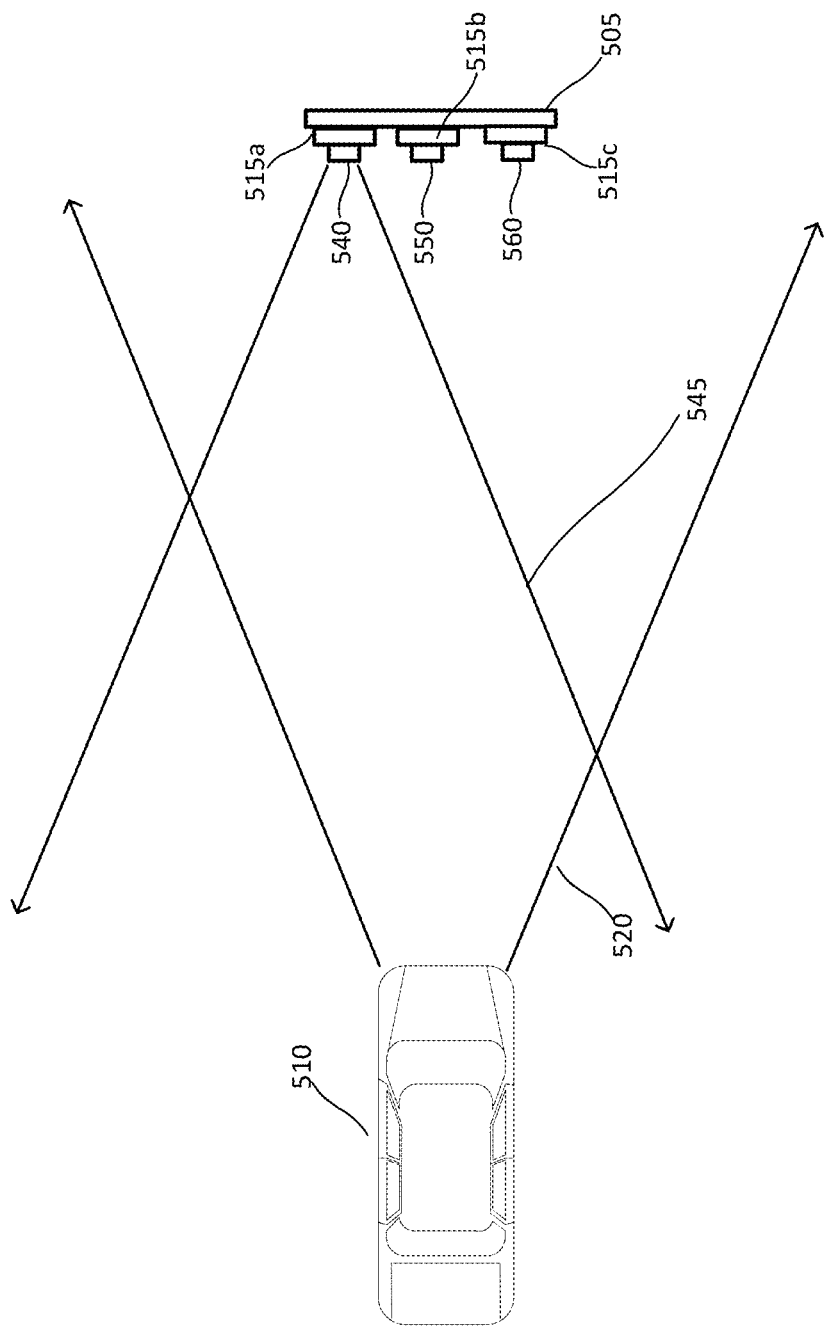

FIG. 5E shows an example in which the light 515*a* of the traffic signal 505 is illuminated and the lights 515*b* and 515*c* are not illuminated. The sensor device 540 is configured to enable the transmit capability of the RFID tag 585 of the sensor device 540 in response to the light 515*a* being illuminated. The sensor devices 550 and 560 are configured to disable the transmit capability of their respective RFID tags in response to the lights 515*b* and 515*c* not being illuminated. The interrogation signal 520 from the vehicle 510 causes the sensor device 540 to generate a response signal 545. The navigation system of the vehicle 510 may use this information to alert a driver of the vehicle of the state of the traffic signal. For example, the vehicle may notify the driver that the vehicle 510 is approaching a red light and will need to stop. In some implementations, the vehicle 510 may be an autonomous or semi-autonomous vehicle and the navigation system of the vehicle 510 may use the information regarding the state of the traffic signal 505 to send control signals to the vehicle to cause the vehicle brake, decelerate, steer, or perform other actions based on the state of the traffic signal 505. A technical benefit of using this approach to determine the state of the traffic signals is that the sensor devices 120 may be disposed on the traffic signal 505 to monitor when a particular light of the traffic signal illuminates. The RFID tag of the sensor device 120 monitoring a particular light may be enabled in response to the light being illuminated. The vehicle 510 may interrogate the sensor devices 120 disposed on the traffic signal 120 and the tag which transmits the response signal corresponds to the light of the traffic signal that is illuminated. This approach provides a significant improvement over image analysis techniques which may be used to analyze imagery of the traffic signal 505 to determine the state of the traffic signal. The performance of such image analysis techniques may be negatively impacted by ambient lighting conditions and/or weather conditions, such as snow, fog, or smoke, which may interfere with image analysis techniques. However, the RFID-based techniques provided herein are not impacted by such conditions.

FIGS. 6A and 6B are diagrams of example switch logic 605 that may be used in the example implementation shown in the preceding figures. The switch logic 605 shown in FIGS. 6A and 6B is implemented using a Bipolar Junction Transistor (BJT) 620. The current flow through the emitter of the BJT 620 is controlled by an amount of current applied to the base by the voltage source 610. The current source 625 is connected to the collector terminal of the BJT 620 and the emitter of the BJT is connected to the ground 630.

The switch logic 605 may be used to connect the antenna of the RFID tag of the sensor device 120 as the current source 625. An electrical current is generated by the antenna of the RFID tag in response to the interrogation signal 140 transmitted by the sensor reader device 110. The voltage source 610 may be the sensor of the sensor device 110, which may be configured to output a sensor signal responsive to sensing that a threshold state for outputting the sensor signal has been met.

The switch logic 605 may be used to control whether that current is directed to the ground 620 instead of powering the RFID tag to process the interrogation signal 140 and to generate the response signal 150. In the example shown in FIG. 6A, a non-zero voltage is applied to the voltage source 610, which causes the switch logic to connect the current source 625 to ground 630. The non-zero voltage may be the sensor signal generated by the sensor 315 of the sensor device 120 described in the preceding examples. Thus, the zero voltage shown in FIG. 6B may be when the sensor 315 of the sensor device 120 is not generating the sensor signal, which causes the switch logic to disconnect the current source 625 from ground 630. The RFID tag of the sensor device 120 would be prevented from transmitting a response signal 150 while the non-zero voltage is being applied and would not be prevented from transmitting the response signal 150 while no voltage is being applied. This approach may be used to disable the transmit capability of the RFID tag of the sensor device 120 in response to the sensor device 120 outputting a sensor signal.

The example implementation shown in FIGS. 6A and 6B use a Negative-Positive-Negative (NPN) type BJT. However, other implementations may use a Positive-Negative-Positive (PNP) type BJT. In such implementations, the BJT 620 would connect the current source 625 to the ground 630 if a zero voltage is provided at the voltage source 610 and disconnecting the current source 625 from the ground 630 if a non-zero voltage is received at the input voltage. This may be used in implementations in which the transmit capability of the RFID tag of the sensor device 120 is disabled by default and enabled in response to a sensor signal being output by the sensor of the sensor device 120. In contrast, the example implementations shown in FIGS. 6A and 6B have the transmit capability of the RFID tag of the sensor device 120 enabled by default, and the transmit capability of the RFID tag is disabled in response to a sensor signal being output by the sensor of the sensor device 120.

Figure 6C:
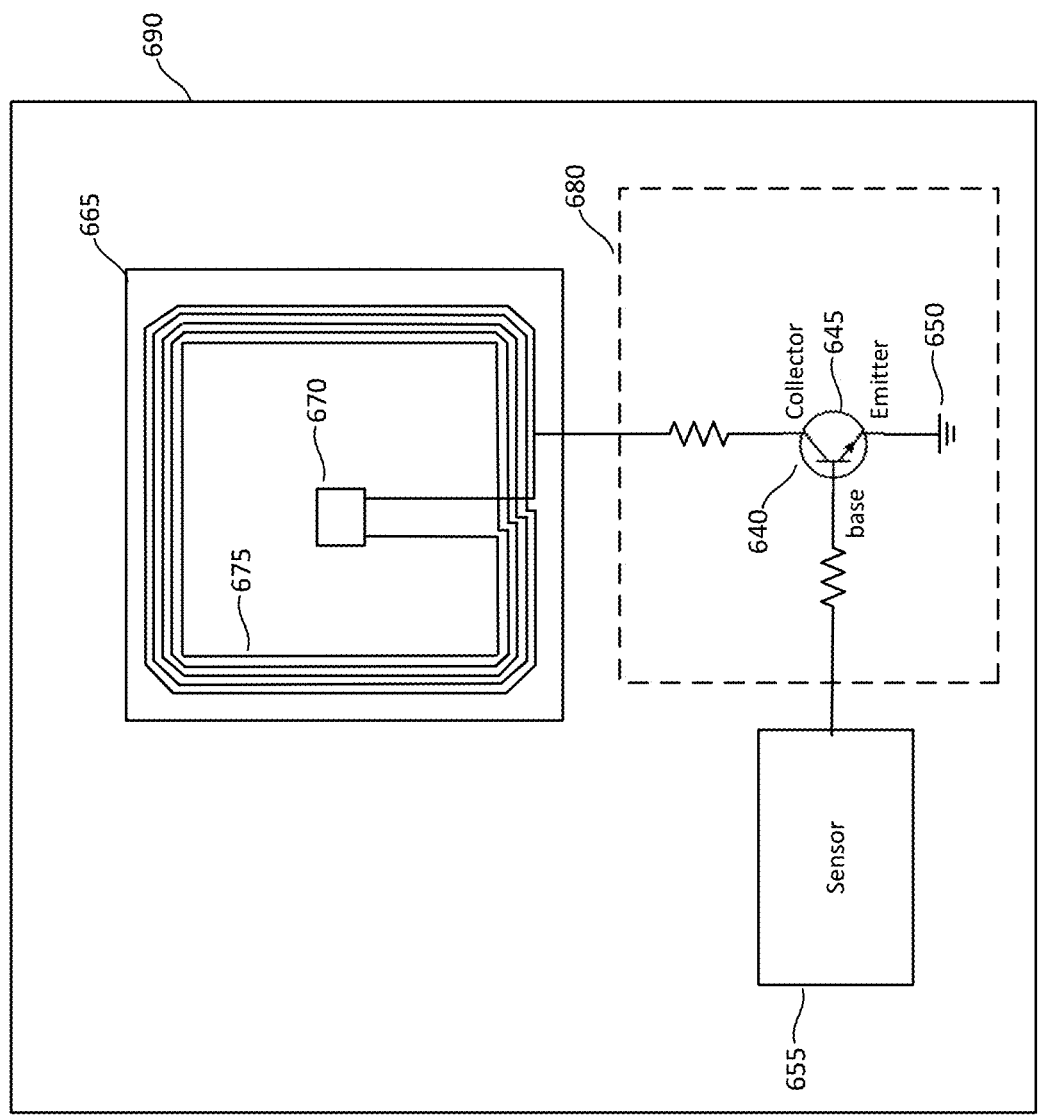
FIG. 6C is a diagram showing the example sensor device that includes switch logic similar to that shown in FIGS. 6A and 6B.

FIG. 6C is a diagram showing the example sensor device 690 that includes switch logic similar to that shown in FIGS. 6A and 6B. The sensor device 690 may be used to implement the sensor device 120 shown in the preceding examples. The sensor device 190 includes a sensor 655, an RFID tag 665, and a tag controller 680. The sensor 655 may be similar to the sensor 315 and/or other sensors discussed in the preceding examples. The RFID tag 665 may be similar to the RFID tag 305 and/or other RFID tags discussed in the preceding examples. The tag controller 680 may be similar to the tag controller 310 and/or other tag controllers shown in the preceding examples.

The RFID tag 665 includes an antenna 675 and a controller chip 670. As discussed in the preceding examples, the RFID tag 665 may receive an interrogation signal 140 using the antenna 675 which may power the controller chip 670. The chip may generate and modulate a response signal 150 which may then be transmitted by the antenna 675.

The sensor 655 may be configured to detect a first state of a monitored device (not shown) and output a sensor signal the first state meets a first threshold condition. The sensor signal provides a non-zero voltage input to the switch 645 of the tag controller 680, which causes the switch logic 640 to connect the antenna 675 of the RFID tag 665 to ground 650. This disables the transmit capability of the RFID tag by causing a current induced in the antenna 675 in response to receiving an interrogation signal 140 to go to ground 650 rather than powering the controller chip 670 to generate and modulate a response signal 150 for transmission by the antenna 675. When the sensor 655 is not outputting the sensor signal, the switch logic 645 disconnects the antenna 675 of the RFID tag 665, which enables the transmit capability of the RFID tag 665 so the RFID tag 665 may transmit a response signal 150 in response to receiving an interrogation signal 140.

Figure 7:
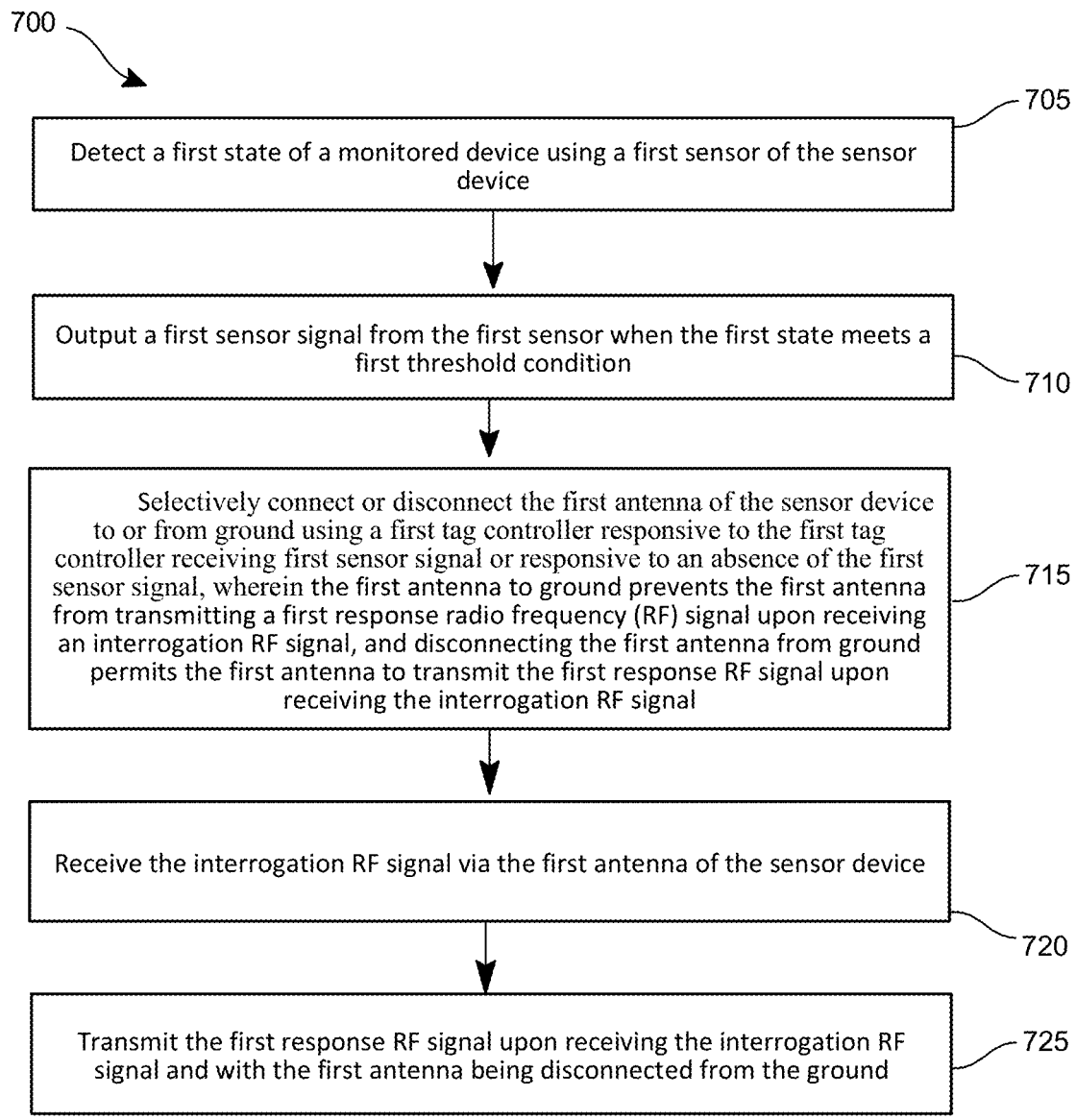
FIG. 7 is a flow chart of an example process implemented in a sensor device.

FIG. 7 is a flow chart of an example process 700 for operating a sensor device as presented herein. The process 700 may be implemented by a sensor device, such as the sensor device 120 discussed in the preceding examples.

The process 700 may include an operation 705 of detecting a first state of a monitored device using a first sensor of the sensor device. The sensor device 120 includes a sensor 315. The sensor 315 may be configured to monitor a state of a monitored device 130. The sensor device 120 may include various types of sensors, including but not limited to light sensors, accelerometers, temperature sensors, vibration sensors, moisture sensors, chemical sensors, pressure sensors, and/or other types of sensors that may be used to monitor a state of a monitored device 130 and/or of a monitored area.

The process 700 may include an operation 710 of outputting a first sensor signal from the first sensor when the first state meets a first threshold condition. The sensor 315 of the sensor device 120 may be configured to output the first sensor signal in response to the first monitored state meeting a first threshold condition. The first threshold condition may be dependent upon the type of sensor included in the sensor device 120, and the threshold condition may also depend upon the particular implementation. In an example implementation, the sensor 315 is a vibration sensor and the monitored device 130 is a pump. The sensor 315 is configured to measure a vibration frequency of the pump. In some implementations, the sensor 315 may be configured to output the first sensor signal responsive to the vibration frequency remaining below a first vibration threshold, which may indicate that that the pump is operating correctly. In this implementation, the sensor 315 outputting the sensor signal indicates that the pump appears to be operating correctly and the sensor 315 not outputting the sensor signal indicates that the pump may not be operating correctly because the vibration frequency has met or exceeded the first vibration threshold. Conversely, the sensor 315 may be configured to output the first sensor signal responsive to the vibration frequency meeting or exceeding the first vibration threshold. The sensor 315 outputting the first sensor signal indicates that the monitored device 130 may require repair or maintenance. In contrast, the previous example outputs the sensor outputs the first sensor signal to indicate that the monitored device 130 appears to be operating correctly, at least with respect to vibration produced by the pump. These examples illustrate various approaches that may be used for configuring the sensor 315 to output the sensor signal. These examples do not limit the techniques provided herein to these specific example implementations.

The process 700 may include an operation 715 of connecting or disconnecting the first antenna of the sensor device to or from ground using the first tag controller responsive to the first tag controller receiving first sensor signal or responsive to an absence of the first sensor signal. Connecting the first antenna to ground prevents the first antenna from transmitting a first response radio frequency (RF) signal upon receiving an interrogation RF signal and disconnecting the first antenna from ground permits the first antenna to transmit the first response RF signal upon receiving the interrogation RF signal. In some implementations, the first tag controller may be configured to connect the first antenna to the ground responsive to receiving the first sensor signal. In other implementations, the first tag controller may be configured to disconnect the first antenna from the ground responsive to receiving the first sensor signal. In yet other implementations, the tag controller may be configured to connect the first antenna to the ground responsive when the first sensor is not outputting the first sensor signal. Furthermore, the tag controller may be configured to disconnect the first antenna from the ground when the first sensor is not outputting the first sensor signal. Thus, the tag controller may be configured to respond to the receiving the sensor signal or may be configured to respond to not receiving the sensor signal.

The process 700 may include an operation 720 of receiving the interrogation RF signal via the first antenna of the sensor device. As discussed in the preceding examples, the sensor reader device 110 may transmit an interrogation signal 140 that may be received by the sensor device 120. The antenna of the sensor device 120 may be an antenna of an RFID tag 305 of the sensor device as show in FIGS. 3 and 4.

The process 700 may include an operation 725 of transmitting the first response RF signal upon receiving the interrogation RF signal and with the first antenna being disconnected from the ground. The sensor device 120 may transmit the response signal. The response signal may be a spread spectrum signal to reduce the interference associated with tags from multiple sensor devices 120 being disposed proximate to one another and transmitting a response signal simultaneously. The response signal may include identifying the type of monitored device 130, a unique identifier for the monitored device 130 which is being monitoring, geographical coordinate information associated with the location of the monitored device 130, and/or other information that may be used when processing the data obtained from the sensor device 120. The response signal may include information associated with the status of the monitored device 130. This process may be used to selectively control whether a response signal is transmitted in response to an interrogation signal. Depending upon the implementation, the transmission of the response signal may indicate that the sensor device 120 has detected a signal from the monitored device 130 indicating that the monitored device 130 is in a particular state. For example, in the traffic signal example, the sensor device 120 transmits a response signal associated with the light of the traffic signal that is illuminated to convey the state of the light to a vehicle that includes the sensor reader device 110. Returning to the pump example, the sensor device 120 may be configured to transmit the response signal where the pump is operating as expected or may be configured to transmit the response signal where the pump requires repairs or maintenance. Different implementations may configure the sensor device 120 to selectively disable or enable the transmission of the response signals to convey information regarding the monitored device 130.

Figure 10:
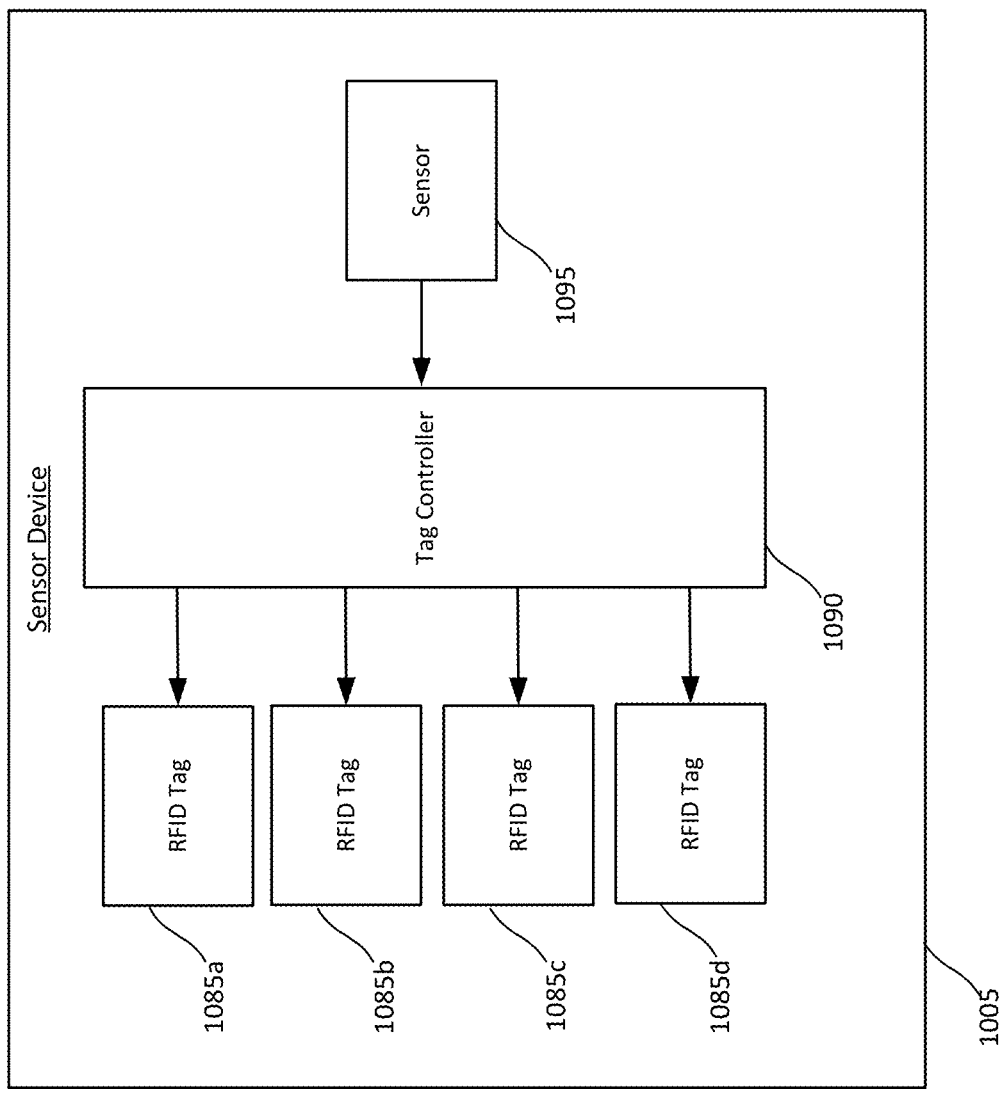
FIG. 10 is a diagram showing another example of a sensor device.

FIG. 10 is a diagram showing another example of a sensor device 1005. The sensor device 1005 includes multiple RFID tags. The example implementation shown in FIG. 10 includes four RFID tags 1085a, 1085b, 1085c, and 1085d. Other implementations may include a different number of RFID tags. The sensor device 1005 also includes a sensor 1095 and tag controller 1090.

The sensor 1095 may be configured to monitor a state of a monitored device, such as the monitored device 130. The sensor 1095 may be configured to monitor a condition or characteristic of a monitored area of an environment in which the sensor device 1005 is deployed. The sensor 1095 may be configured to output a sensor signal in response to the monitored state or condition meeting a threshold condition. The sensor 1095 may be implemented using various types of sensors, including but not limited to light sensors, accelerometers, temperature sensors, vibration sensors, moisture sensors, chemical sensors, pressure sensors, and/or other types of sensors that may be used to monitor a state of a monitored device 130 and/or of the monitored area. The type of signal and the state of the signal being sensed depends upon the type of monitored device or monitored area. The threshold condition of the sensor 1095 may be selected based on the information that the sensor device 1005 is configured to detect and convey to a sensor reader device 110.

The sensor 1095 may be configured to output a sensor signal having a voltage that is proportional to a sensed state of the monitored device 130 or monitored area. The tag controller 1090 may be configured to selectively connect or disconnect the antenna of a particular combination of the RFID tags 1085a, 1085b, 1085c, and 1085d in response to the voltage of the sensor signal from the sensor 1095. The voltage of the sensor signal may depend upon the implementation of the sensor 1095. If the sensor 1095 is a photodetector, the sensor 1095 may be configured to generate a sensor signal having a voltage proportional to the intensity of light incident on a photovoltaic cell of the sensor 1095. If the sensor 1095 is an accelerometer, the sensor 1095 may be configured to generate a sensor signal having a voltage proportional to the acceleration measured by the sensor 1095. And if the sensor 1095 is a chemical sensor, the sensor 1095 may be configured to generate a sensor signal having a voltage proportional to a concentration of a particular chemical measured by the sensor 1095. The sensor device 1005 may include other types of sensors that may be configured to measure other physical properties of the monitored device 130 or the monitored area.

The sensor device 1005 shown in FIG. 10 includes four RFID tags 1085a, 1085b, 1085c, and 1085d. The RFID tags 1085a, 1085b, 1085c, and 1085d may be similar to the RFID tag 405 shown in FIG. 4 or the other RFID tags shown in the preceding examples. The tag controller 1090 may be configured to selectively enable or disable the transmit capabilities of the RFID tags 1085a, 1085b, 1085c, and 1085d based on a voltage of the sensor signal and/or other attributes of the sensor signal received from the sensor 1095.

The tag controller 1090 may be configured to selectively connect or disconnect the antenna of each of the RFID tags 1085a, 1085b, 1085c, and 1085d from ground to individually enable or disable the transmit capabilities of each of the RFID tags 1085a, 1085b, 1085c, and 1085d. The tag controller 1090 may be configured to individually connect and/or disconnect the antennas of the RFID tags 1085a, 1085b, 1085c, and 1085d from ground. Those RFID tags for which the antennas have been disconnected from ground may transmit a response signal 150 in response to an interrogation signal 140 transmitted by a sensor reader device 110, while those RFID tags for which the antennas have been connected to ground are unable to transmit a response signal 150 in response to the interrogation signal 140. The tag controller 1090 may selectively connect or disconnect the antenna of each of the RFID tags 1085a, 1085b, 1085c, and 1085d in various combinations to convey state information for the monitored device 130 or the monitored area to the sensor reader device 110. Different combinations of RFID tags may be enabled to transmit a response signal 150 to represent different states of the monitored device 130 or the monitored area. For example, the tag controller 1090 may be configured to selectively enable a predetermined set of the RFID tags 1085a, 1085b, 1085c, and 1085d and selectively disable a predetermined set of the RFID tags 1085a, 1085b, 1085c, and 1085d responsive to receiving a sensor signal falling within a particular voltage range and/or other attributes of the sensor signal. The tag controller 1090 may be configured to respond to the multiple voltage ranges of the sensor signal and to enable and/or disable a respective combination of the RFID tags 1085a, 1085b, 1085c, and 1085d associated with each respective voltage range. A technical benefit of this approach is that the sensor device 1005 with multiple RFID tags may convey more detailed state information than sensor devices that include a single RFID tag.

The sensor reader device 110 may receive response signals 150 from one or more of RFID tags of the RFID tags 1085a, 1085b, 1085c, and 1085d and analyze the received response signals 150. The sensor reader device 119 may determine which RFID tags of the RFID tags 1085a, 1085b, 1085c, and 1085d responded to the interrogation signal 140. The response signal 150 transmitted by an RFID tag may include information identifying the type of monitored device 130 or monitored area being monitored, a unique identifier for the monitored device 130 or monitored area, geographical coordinate information associated with the location of the monitored device 130 or monitored area, and/or other information that may be used when processing the data obtained from the sensor device 120. The response signal 150 may include an identifier that may be used by the sensor reader device 110 to discriminate between the response signals of each of the RFID tags 1085a, 1085b, 1085c, and 1085d. Thus, the sensor reader device 110 determine the state of the monitored device 130 or monitored area being conveyed by the sensor device 1005.

The following example implementation shows one way in which the sensor device 1005 may be used. In this implementation, the sensor 1095 is a color-sensitive photovoltaic sensor that is configured to respond to different colors of light. Each color of light may be represented by a range of wavelengths, and the color sensitive photovoltaic sensor may be configured to output a sensor signal having specified voltage for each color of light that the color-sensitive photovoltaic sensor is configured to detect. The sensor may be configured to monitor a light on a monitored device 130 that is configured to represent a state of the monitored device 130. The monitored device 130 may be configured to cause the light to emit a specific color based on the state of the monitored device 130. For example, the monitored device 130 may be configured to cause the light to emit green light to indicate that the monitored device 130 is operating correctly. The monitored device 130 may be configured to cause the light to emit an amber light to indicate a warning state that the monitored device 130 may be operating outside of first desired operating parameters. The warning state may indicate that the monitored device 130 may require maintenance or repair but may still be operating. The monitored device 130 may be configured to cause the light to emit a red light to indicate that the monitored device 130 may have failed or is operating outside of second desired operating parameters that indicate that the monitored device 130 requires repair or replacement. The color-sensitive photovoltaic detector may be configured to output a sensor signal having a first voltage responsive to detecting green light, a second voltage responsive to detecting amber light, and a third voltage responsive to detecting red light. The tag controller 1090 may be configured to enable a first subset of the RFID tags 1085*a*, 1085*b*, 1085*c*, and 1085*d* and to disable the remaining RFID tags 1085*a*, 1085*b*, 1085*c*, and 1085*d* respective to receiving a sensor signal having the first voltage. The tag controller 1090 may be configured to enable a second subset of the RFID tags 1085*a*, 1085*b*, 1085*c*, and 1085*d* and to disable the remaining RFID tags 1085*a*, 1085*b*, 1085*c*, and 1085*d* responsive to receiving a sensor signal having the second voltage The tag controller 1090 may also be configured to enable a third subset of the RFID tags 1085*a*, 1085*b*, 1085*c*, and 1085*d* and to disable the remaining RFID tags 1085*a*, 1085*b*, 1085*c*, and 1085*d* respective to receiving a sensor signal having the third voltage. The RFID tags that have been enabled by the tag controller 1090 may then respond to an interrogation signal 140 from the sensor reader device 110 and respond with a respective response signal 150. The sensor reader device 110 may be configured to receive these response signals 150 and determine the status of the monitored device 130 based on the response signals. The sensor reader device 110 may then undertakes one or more actions responsive to determining the status of the monitored device 130, such as presenting the status of the monitored device 130 to a user of the sensor reader device 110 by presenting an audio and/or visual representation of the status of the monitored device 130, collecting the status information and storing the status information in a memory of the sensor reader device 110 for later processing by the sensor reader device 110 and/or by an external computing device or service, and/or sending the status information to an external computing device and/or service for processing. Whereas the example discussed above includes a color-sensitive photovoltaic sensor, other implementations may include other types of sensors that may be configured to detect and output sensor signals for multiple sensed states.

Figure 11:
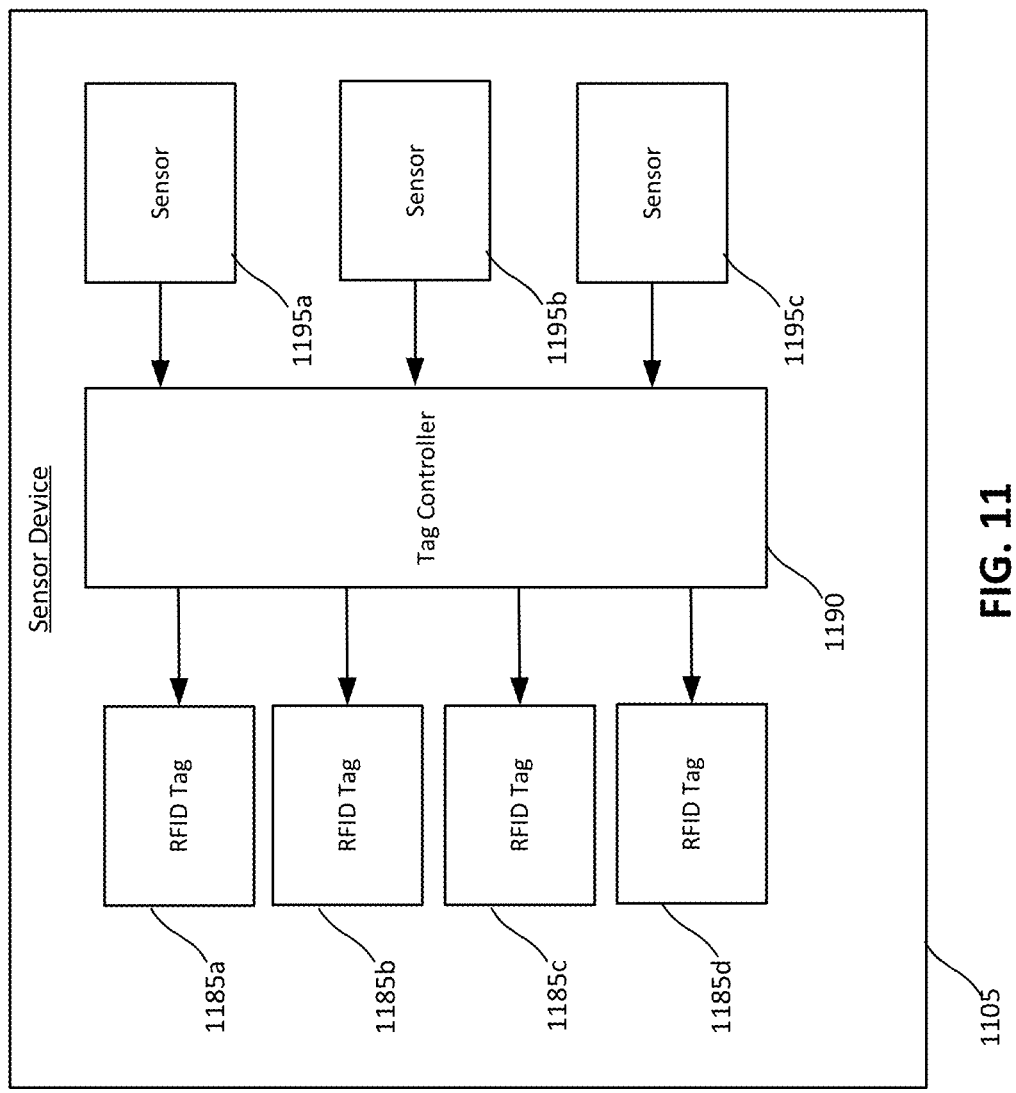
FIG. 11 is a diagram showing another example of a sensor device.

FIG. 11 is a diagram showing another example of a sensor device. The sensor device 1105 includes multiple RFID tags. The example implementation shown in FIG. 11 includes four RFID tags 1185*a*, 1185*b*, 1185*c*, and 1185*d*. Other implementations may include a different number of RFID tags. The RFID tags 1185*a*, 1185*b*, 1185*c*, and 1185*d* may be similar to the RFID tags shown in the preceding examples. The sensor device 1105 also includes sensors 1195*a*, 1195*b*, and 1195*c* and tag controller 1190. Other implementations may include a different number of sensors.

The sensor device 1105 includes multiple sensors 1195*a*, 1195*b*, and 1195*c* in contrast with the proceeding examples which use a single sensor. The control logic 1190 may receive a sensor signal from one or more of the sensors 1195*a*, 1195*b*, and 1195*c*. The sensor 1195*a*, 1195*b*, and 1195*c* may be a different type of sensor or the sensor device 1105 may include more than of the same type of sensor. Each sensor 1195*a*, 1195*b*, and 1195*c* may be configured to output a sensor signal responsive to an attribute of the state or condition monitored by the sensor meeting a threshold condition. The threshold associated with each sensor 1195*a*, 1195*b*, and 1195*c* may be mutually different, or one or more of the sensors 1195*a*, 1195*b*, and 1195*c* may be configured to use the same threshold for determining when to output the sensor signal. For example, a first sensor may be a temperature sensor configured to measure a temperature of the monitored device 130 as one attribute of the state of the monitored device 130 and a second sensor may be a vibration sensor configured to measure vibration of the monitored device 130 as a second attribute of the state of the monitored device 130. This example illustrates how a combination of sensors may be used to determine various attributes of the state of a monitored device 130 or monitored area but does not limit the techniques herein to this specific implementation. The sensor device 1105 may be customized to include a set of sensors that monitor the particular attributes of interest in a particular for a particular monitored device 130 or monitored area.

The control logic 1190 may be configured to selectively enable or connect/disconnect the antenna of a particular combination of the RFID tags 1185*a*, 1185*b*, 1185*c*, and 1185*d* in response to the sensor signal or signals received from the sensors 1195*a*, 1195*b*, and 1195*c*. The tag controller 1190 may be configured to map the combination of sensor signals representing a state of the monitored device 130 or monitored area to a corresponding configuration of enabled and disabled RFID tags of the RFID tags 1185*a*, 1185*b*, 1185*c*, and 1185*d*. The RFID tags that have been enabled may respond to an interrogation signal 140 of a sensor reader device 110 to convey state information for the monitored device 130 or monitored area. A technical benefit of this approach is that the sensor device 1005 with multiple RFID tags may convey more detailed state information than sensor devices that include a single RFID tag and/or single sensor.

Figure 12:
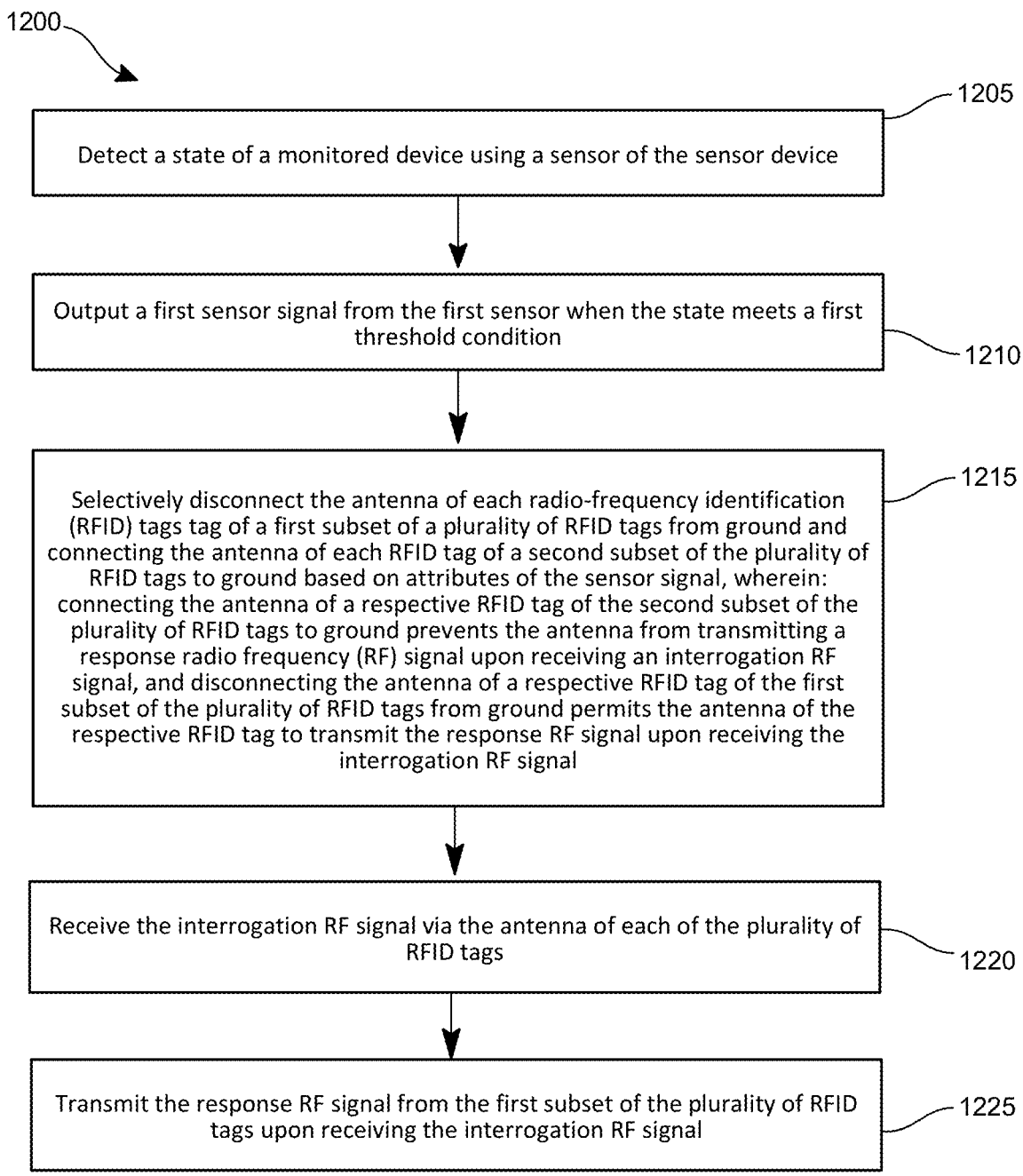
FIG. 12 is a flow chart of an example process implemented in a sensor device.

FIG. 12 is a flow chart of an example process 1200 for testing performance of software product versions. The process 1200 may be implemented by a sensor device, such as the sensor device 1005 or the sensor device 120 discussed in the preceding examples.

The process 1200 may include an operation 1205 of detecting a state of a monitored device 130 using a first sensor of the sensor device 1005. The sensor device 1005 includes a sensor 1095. The sensor 1095 may be configured to monitor a state of a monitored device 130 and/or a monitored area of an environment in which the sensor device 1005 is disposed. The sensor device 1005 may include various types of sensors, including but not limited to light sensors, accelerometers, temperature sensors, vibration sensors, moisture sensors, chemical sensors, pressure sensors, and/or other types of sensors that may be used to monitor a state of a monitored device 130 and/or of the monitored area.

The process 1200 may include an operation 1210 of outputting a sensor signal from the sensor when the state meets a threshold condition. The sensor 1095 of the sensor device 1005 may be configured to output the sensor signal in response to the monitored state meeting a threshold condition. The threshold condition may be dependent upon the type of sensor included in the sensor device 1005, and the threshold condition may also depend upon the particular implementation.

The process 1200 may include an operation 1215 of selectively disconnecting the antenna of each RFID tag of a first subset of a plurality of RFID tags from ground and connecting the antenna of each RFID tag of a second subset of the plurality of RFID tags to ground based on attributes of the sensor signal. Connecting the antenna of a respective RFID tag of the second subset of the plurality of RFID tags to ground prevents the antenna from transmitting a response radio frequency (RF) signal upon receiving an interrogation RF signal and disconnecting the antenna of a respective RFID tag of the first subset of the plurality of RFID tags from ground permits the antenna of the respective RFID tag to transmit the response RF signal upon receiving the interrogation RF signal. The tag controller 1090 may selectively enable or disable a combination of RFID tags of the sensor device 1005 based on the attributes of the sensor signal received from the sensor 1095.

The process 1200 may include an operation 1220 of receiving the interrogation RF signal via the antenna of each of the plurality of RFID tags. The sensor reader device 110 may transmit the interrogation signal 150 as discussed in the preceding examples to attempt obtain response signals 150 from the RFID tags of the sensor device 1005.

The process 1200 may include an operation 1225 of transmitting the response RF signal from the first subset of the plurality of RFID tags upon receiving the interrogation RF signal. The RFID tags that have been enabled are able to transmit a response signal in response to receiving the interrogation signal 140 from the sensor reader device 110. The sensor reader device 110 may receive these response signals 150 from the combination of RFID tags that have been enabled by the tag controller 1090. The sensor reader device 110 may be configured to determine a status of the monitored device 130 or monitored area based on the combination of response signals 150 received in response to the interrogation signal 140. The response signals 150 may also include additional information that may be used to determine the status of the monitored device 130 or monitored area.

Figure 13:
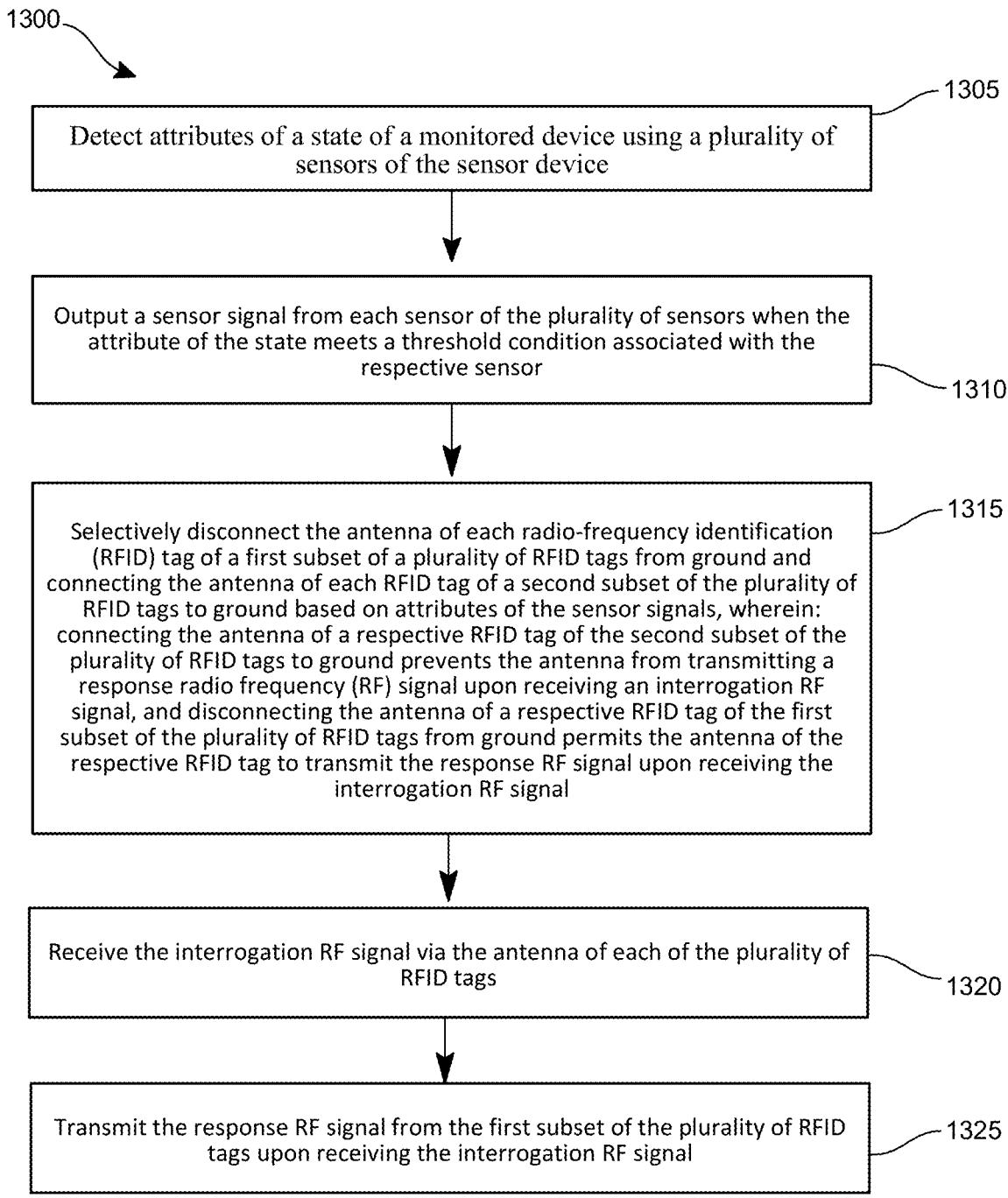
FIG. 13 is a flow chart of an example process implemented in a sensor device.

FIG. 13 is a flow chart of an example process 1300 for operating a sensor device. The process 1300 may be implemented by a sensor device, such as the sensor device 1105 or the sensor device 120 described in the preceding examples.

The process 1300 may include an operation 1305 of detecting attributes of a state of a monitored device using a plurality of sensors of the sensor device. The sensor device 1105 may include multiple sensor devices that may each be configured to measure an attribute of the state of the monitored device 130 or a monitored area as discussed in the preceding examples.

The process 1300 may include an operation 1310 of outputting a sensor signal from each sensor of the plurality of sensors when the attribute of the state meets a threshold condition associated with the respective sensor. The sensors of the sensor device 1105 may be configured to output the sensor signal in response to the monitored state meeting a threshold condition. The threshold condition may be dependent upon the type of sensor and the threshold condition may also depend upon the particular implementation.

The process 1300 may include an operation 1315 of selectively disconnecting the antenna of each radio-frequency identification (RFID) tag of a first subset of a plurality of RFID tags from ground and connecting the antenna of each RFID tag of a second subset of the plurality of RFID tags to ground based on attributes of the sensor signals. Connecting the antenna of a respective RFID tag of the second subset of the plurality of RFID tags to ground prevents the antenna from transmitting a response radio frequency (RF) signal upon receiving an interrogation RF signal and disconnecting the antenna of a respective RFID tag of the first subset of the plurality of RFID tags from ground permits the antenna of the respective RFID tag to transmit the response RF signal upon receiving the interrogation RF signal. The tag controller 1105 may be configured to selectively enable or disable a combination of RFID tags of the sensor device 1005 based on the attributes of the sensor signal received from the sensor 1095 as discussed in the preceding examples.

The process 1300 may include an operation 1320 of receiving the interrogation RF signal via the antenna of each of the plurality of RFID tags. The sensor reader device 110 may transmit the interrogation signal 150 as discussed in the preceding examples to attempt obtain response signals 150 from the RFID tags of the sensor device 1005.

The process 1300 may include an operation of 1325 of transmitting the response RF signal from the first subset of the plurality of RFID tags upon receiving the interrogation RF signal. The RFID tags that have been enabled are able to transmit a response signal in response to receiving the interrogation signal 140 from the sensor reader device 110. The sensor reader device 110 may receive these response signals 150 from the combination of RFID tags that have been enabled by the tag controller 1090. The sensor reader device 110 may be configured to determine a status of the monitored device 130 or monitored area based on the combination of response signals 150 received in response to the interrogation signal 140. The response signals 150 may also include additional information that may be used to determine the status of the monitored device 130 or monitored area.

The detailed examples of systems, devices, and techniques described in connection with FIGS. 1-7 and 10-13 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 and 10-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
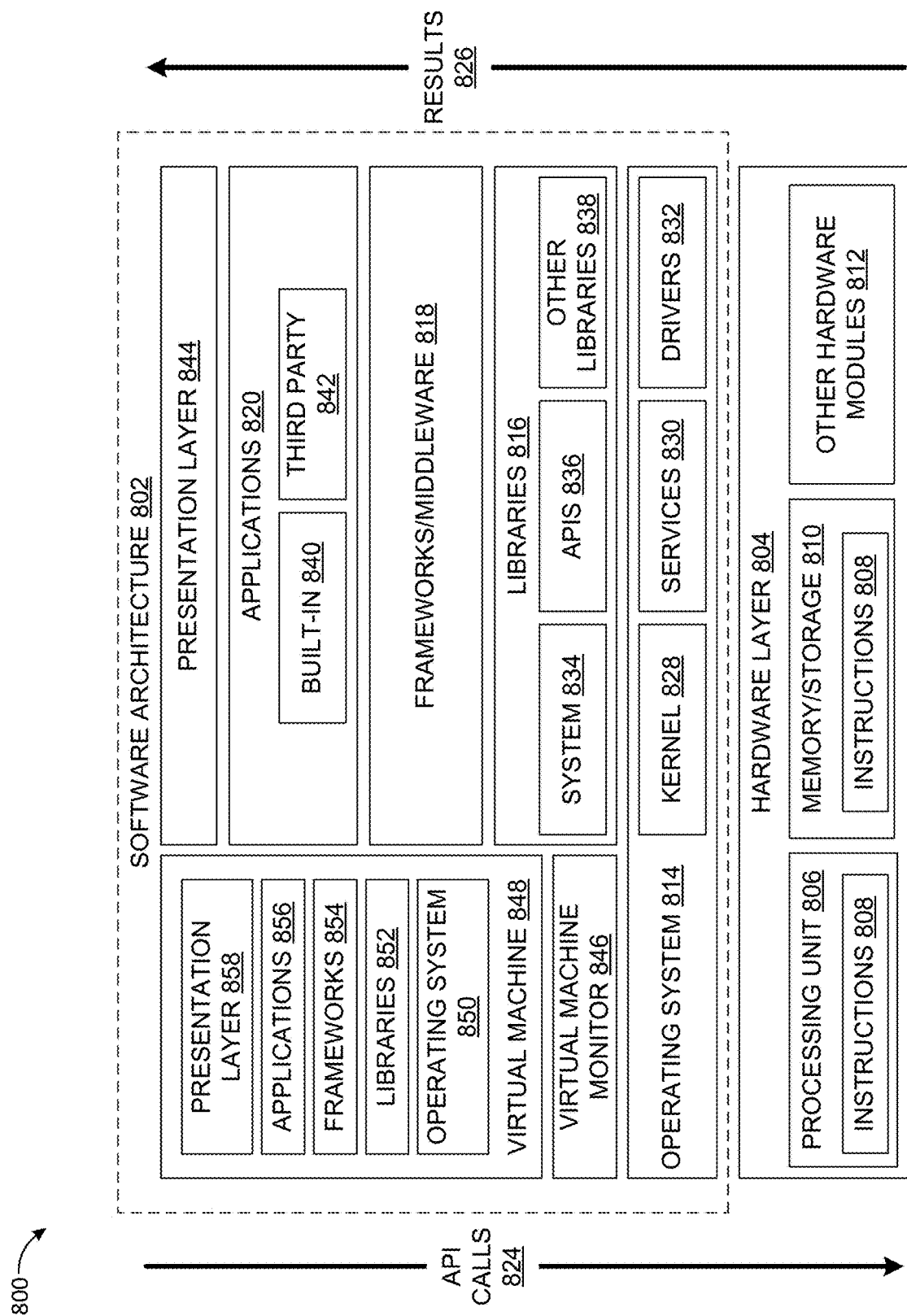
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
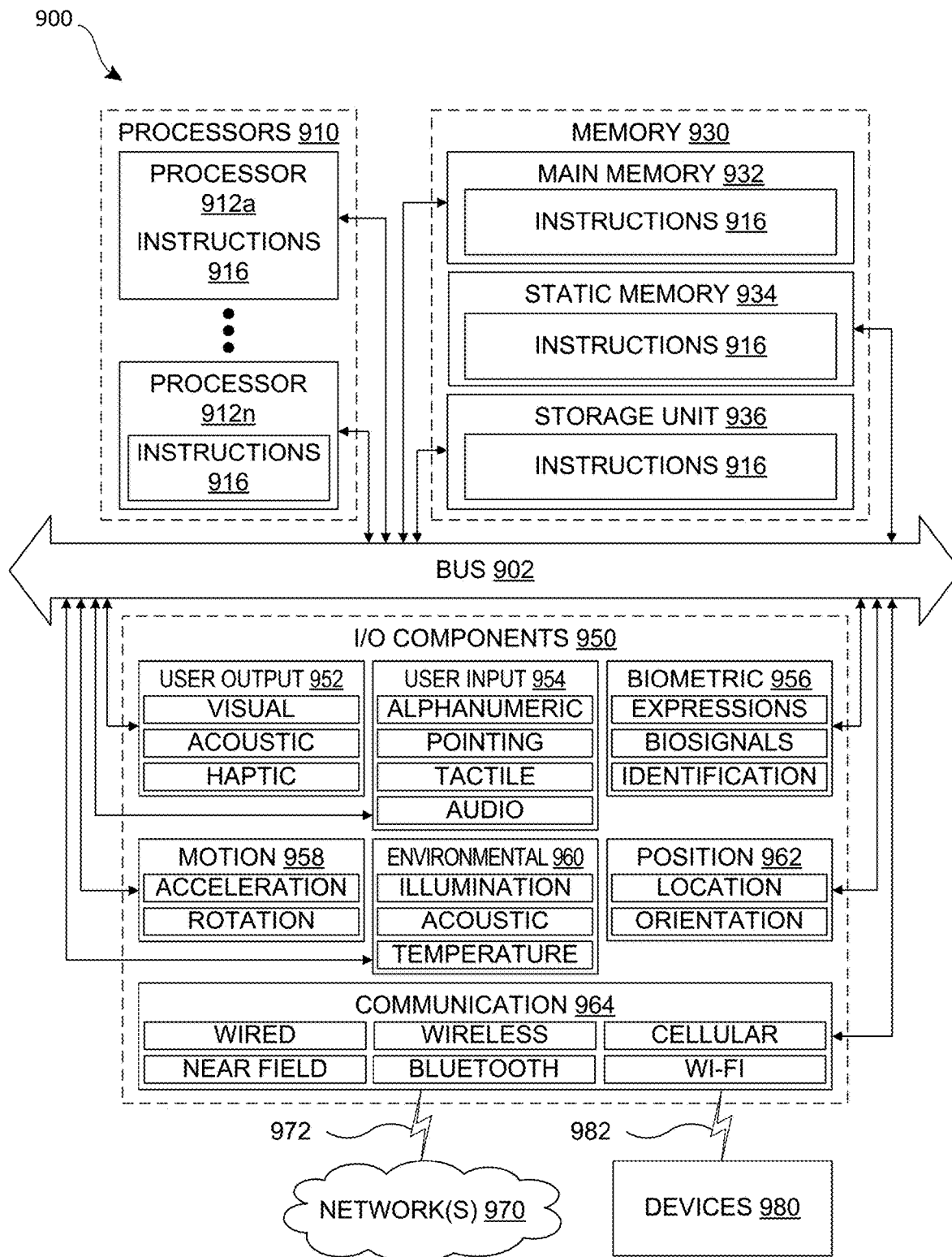
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912*a* to 912*n* that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A sensor device comprising:
    a first sensor configured to:
        detect a first state of a monitored device;
        in response to the first state meeting a first threshold condition, output a first sensor signal; and
        in response to the first state not meeting the first threshold condition, not output the first sensor signal;
    a first radio-frequency identification (RFID) tag including:
        a first antenna configured to receive an interrogation radio frequency (RF) signal, and
        a first circuit coupled to the first antenna, the first circuit configured to receive the interrogation RF signal from the first antenna, generate a first response RF signal in response to the received interrogation RF signal, and cause the first antenna to transmit the first response RF signal,
        wherein the first RFID tag is not connected to a power source;
    and
    a tag controller configured to selectively couple or decouple the first antenna to or from ground depending upon whether the first sensor signal is present, wherein coupling the first antenna to the ground prevents the first antenna from transmitting the first response RF signal.

2. The sensor device of claim 1, wherein the tag controller is configured alternatively to (1) decouple the first antenna from the ground responsive to receiving the first sensor signal from the first sensor, or (2) couple the first antenna to the ground.

3. The sensor device of claim 1, wherein the tag controller is configured alternatively to (1) couple the first antenna to the ground upon receiving the first sensor signal from the first sensor, or (2) decouple the first antenna from the ground.

4. The sensor device of claim 1, wherein:
    the sensor device includes a plurality of RFID tags including the first RFID tag, each tag of the plurality of RFID tags including an antenna and a circuit; and
    the tag controller is configured to selectively couple or decouple the antenna of each RFID tag of the plurality of RFID tags to or from the ground based on attributes of the first sensor signal, wherein coupling the respective antenna of a respective RFID tag to the ground prevents the respective RFID tag from transmitting a respective response RF signal.

5. The sensor device of claim 1, wherein:
    the sensor device includes a plurality of RFID tags including the first RFID tag, each tag of the plurality of RFID tags including an antenna and a circuit;
    a plurality of sensors configured to output sensor signals, each sensor configured to detect an attribute or state of a monitored device, to output a sensor signal representative of when the attribute of the state meets a threshold condition; and
    the tag controller is configured to selectively couple or decouple the antenna of each RFID tag of the plurality of RFID tags to or from the ground based on attributes of the sensor signals, wherein coupling the respective antenna of a respective RFID tag to the ground prevents the respective RFID tag from transmitting a respective response RF signal.

6. The sensor device of claim 1, wherein:
    the first sensor is a first photodetector to detect a first light output by the monitored device,
    the first light indicative of a first state of the monitored device,
    the first sensor is configured to output the first sensor signal upon detecting the first light.

7. The sensor device of claim 6, further comprising:
    a second sensor configured to:
        detect a second light output by the monitored device;
        in response to the second light meeting a second threshold condition, output a second sensor signal; and
        in response to the second light not meeting the second threshold condition, not output the second sensor signal;
    a second RFID tag including:
        a second antenna configured to receive the interrogation RF signal, and
        a second circuit coupled to the second antenna, the second circuit configured to receive the interrogation RF signal from the second antenna, generate a second response RF signal, and cause the second antenna to transmit the second response RF signal;
    a second tag controller configured to selectively couple or decouple the second antenna to or from ground depending upon whether the second sensor signal is present, wherein coupling the second antenna to the ground prevents the second antenna from transmitting a second response RF signal.

8. The sensor device of claim 4, wherein the monitored device comprises a traffic signal, and wherein the first sensor is configured to output the first sensor signal in response to illumination of a light source of the traffic signal.

9. The sensor device of claim 4, wherein the first sensor provides power to the first circuit and the first antenna for sending the first response RF signal.

10. The sensor device of claim 4, wherein the first response RF signal includes an identifier associated with the monitored device, location information associated with the monitored device, or both.

11. The sensor device of claim 1, wherein the first circuit is configured to cause the first response RF signal to be transmitted as a spread spectrum signal, to repeatedly send the first response RF signal while the first sensor outputs the first sensor signal, or both.

12. A method for operating a sensor device, the method comprising:
    detecting a first state of a monitored device using a first sensor of the sensor device;
    outputting a first sensor signal from the first sensor in response to the first state meeting a first threshold condition;
    selectively coupling or decoupling a first antenna of the sensor device to or from ground using a first tag controller depending upon whether the first sensor signal is present, wherein:

coupling the first antenna to the ground prevents the first antenna from transmitting a first response radio frequency (RF) signal upon receiving an interrogation RF signal, and decoupling the first antenna from the ground permits the first antenna to transmit the first response RF signal upon receiving the interrogation RF signal;

receiving the interrogation RF signal via the first antenna of the sensor device; and transmitting the first response RF signal upon determining whether the first sensor signal is present.

13. The method of claim 12, wherein selectively coupling the first tag controller to or decoupling the first antenna from the ground further comprises:

decoupling the first antenna from the ground when the first sensor signal is received from the first sensor; and coupling the first antenna to the ground when the first sensor is not outputting the first sensor signal.

14. The method of claim 12, wherein selectively coupling the first tag controller to or decoupling the first tag controller from the ground in response to the first sensor signal further comprises:

coupling the first antenna to the ground when receiving the first sensor signal from the first sensor; and decoupling the first antenna from the ground when the first sensor is not outputting the first sensor signal.

15. The method of claim 12, wherein:

the sensor device includes a plurality of RFID tags, each tag of the plurality of RFID tags including an antenna and a circuit; and selectively decoupling the antenna of each radio-frequency identification (RFID) tag of a first subset of a plurality of RFID tags from the ground and coupling the antenna of each RFID tag of a second subset of the plurality of RFID tags to the ground based on attributes of the sensor signal, wherein:

coupling the antenna of a respective RFID tag of the second subset of the plurality of RFID tags to the ground prevents the antenna from transmitting a response radio frequency (RF) signal upon receiving an interrogation RF signal, and decoupling the antenna of a respective RFID tag of the first subset of the plurality of RFID tags from the ground permits the antenna of the respective RFID tag to transmit the response RF signal upon receiving the interrogation RF signal; and transmitting the response RF signal from the first subset of the plurality of RFID tags upon receiving the interrogation RF signal.

16. The method of claim 12, wherein:

the sensor device includes a plurality of RFID tags, each tag of the plurality of RFID tags including an antenna and a circuit;

a plurality of sensors configured to output sensor signals, each sensor configured to detect an attribute or state of a monitored device, to output a sensor signal representative of when the attribute of the state meets a threshold condition; and outputting a sensor signal from each sensor of the plurality of sensors when the attribute of the state meets a threshold condition associated with the sensor;

selectively decoupling the antenna of each radio-frequency identification (RFID) tag of a first subset of a plurality of RFID tags from the ground and coupling the antenna of each RFID tag of a second subset of the plurality of RFID tags to the ground based on attributes of the sensor signals, wherein:

coupling the antenna of a respective RFID tag of the second subset of the plurality of RFID tags to the ground prevents the antenna from transmitting a response radio frequency (RF) signal upon receiving an interrogation RF signal, and decoupling the antenna of a respective RFID tag of the first subset of the plurality of RFID tags from the ground permits the antenna of the respective RFID tag to transmit the response RF signal upon receiving the interrogation RF signal; and transmitting the response RF signal from the first subset of the plurality of RFID tags upon receiving the interrogation RF signal.

17. The method of claim 12, wherein:

the first sensor is a first photodetector to detect a first light output by the monitored device, the first light indicative of a first state of the monitored device, the first sensor is configured to output the first sensor signal upon detecting the first light.

18. The method of claim 17, further comprising:

detecting a second state of a monitored device using a second sensor of the sensor device;

outputting a second sensor signal from the second sensor when the second state meets a second threshold condition;

receiving the second sensor signal at a second tag controller, the second tag controller being configured to selectively connect a second antenna of the sensor device to or from the ground;

selectively coupling or decoupling the second antenna of the sensor device to or from the ground using the second tag controller when the second tag controller receives second sensor signal, wherein:

coupling the second antenna to the ground prevents the second antenna from transmitting a second response RF signal upon receiving the interrogation RF signal, and decoupling the second antenna from the ground permits the second antenna to transmit the second response RF signal upon receiving the interrogation RF signal;

receiving the interrogation RF signal via the second antenna of the sensor device; and transmitting the second response RF signal upon receiving the interrogation RF signal and with the second antenna being disconnected from the ground.

19. The method of claim 17, wherein the monitored device comprises a traffic signal, and wherein the first photodetector is configured to output the first sensor signal in response to illumination of a light source of the traffic signal.

20. A computer-readable storage medium on which are stored instructions that, when executed, cause a processor of a programmable device to perform operations of:

detecting a first state of a monitored device using a first sensor of a sensor device;

outputting a first sensor signal from the first sensor in response to the first state meeting a first threshold condition;

selectively coupling or decoupling a first antenna of the sensor device to or from ground using a first tag controller depending upon whether the first sensor signal is present, wherein:

coupling the first antenna to the ground prevents the first antenna from transmitting a first response radio frequency (RF) signal upon receiving an interrogation RF signal, and decoupling the first antenna from the ground permits the first antenna to transmit the first response RF signal upon receiving the interrogation RF signal;

receiving the interrogation RF signal via the first antenna of the sensor device; and transmitting the first response RF signal upon receiving the interrogation RF signal and with the first antenna being disconnected from the ground.

\* \* \* \* \*